(12) United States Patent
Wicks et al.

(10) Patent No.: US 10,060,339 B2
(45) Date of Patent: *Aug. 28, 2018

(54) SYSTEM AND METHODS FOR ENGINE AIR PATH CONDENSATION MANAGEMENT

(71) Applicant: Ford Global Technologies, LLC, Dearborn, MI (US)

(72) Inventors: Christopher Donald Wicks, Allen Park, MI (US); Karen Elizabeth Maceroni, Casco, MI (US); Mark Michael Madin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 53 days.

This patent is subject to a terminal disclaimer.

(21) Appl. No.: 15/044,984

(22) Filed: Feb. 16, 2016

(65) Prior Publication Data
US 2016/0160744 A1    Jun. 9, 2016

Related U.S. Application Data

(63) Continuation of application No. 14/137,402, filed on Dec. 20, 2013, now Pat. No. 9,267,424.

(51) Int. Cl.
*F01N 3/10* (2006.01)
*F02B 29/04* (2006.01)
(Continued)

(52) U.S. Cl.
CPC .......... *F02B 29/0468* (2013.01); *F01N 3/101* (2013.01); *F01N 3/106* (2013.01);
(Continued)

(58) Field of Classification Search
CPC ...... F01N 3/101; F01N 3/106; F02B 29/0456; F02B 29/0468; F02B 37/00;
(Continued)

(56) References Cited

U.S. PATENT DOCUMENTS 1,803,097 A    4/1931  Critchlow
4,055,158 A *  10/1977 Marsee .................. F02M 26/28
                                                    123/568.12
(Continued)

FOREIGN PATENT DOCUMENTS

CN    1435562 A    8/2003
CN    101082515 A   12/2007
(Continued)

OTHER PUBLICATIONS

State Intellectual Property Office of the People's Republic of China, Office Action and Search Report Issued in Application No. 201410776333.3, dated Feb. 8, 2018, 7 pages. (Submitted with Partial Translation).

(Continued)

*Primary Examiner* — Laert Dounis
*Assistant Examiner* — Matthew T Largi
(74) *Attorney, Agent, or Firm* — Julia Voutyras; McCoy Russell LLP

(57) ABSTRACT

A system and methods for routing condensate collected in a heat exchanger reservoir to either an air intake system or a position in the engine exhaust based on the type of contaminate in the condensate and operating parameters of the engine or the catalyst are described. In one particular example, condensate is routed to a first position along the engine air intake system in a first mode of operation, and a second position upstream of the catalyst along the engine exhaust in a second mode of operation, and a third position downstream of the catalyst along the engine exhaust in a third mode of operation. When substantially no contaminates are detected, the condensate may be routed into the engine exhaust upstream of the catalyst in order to cool the catalyst.

16 Claims, 16 Drawing Sheets

(51) Int. Cl.
| | | |
|---|---|---|
| *F02M 25/022* | (2006.01) | |
| *F02M 25/028* | (2006.01) | |
| *F02D 41/22* | (2006.01) | |
| *F02D 41/00* | (2006.01) | |
| *F02B 37/00* | (2006.01) | |
| *F02M 35/10* | (2006.01) | |
| *F02M 26/05* | (2016.01) | |

(52) U.S. Cl.
CPC .......... *F02B 29/0456* (2013.01); *F02B 37/00* (2013.01); *F02D 41/0025* (2013.01); *F02D 41/22* (2013.01); *F02M 25/028* (2013.01); *F02M 25/0222* (2013.01); *F02M 25/0227* (2013.01); *F02M 35/10157* (2013.01); *F02M 35/10268* (2013.01); *F02M 26/05* (2016.02); *Y02T 10/146* (2013.01); *Y02T 10/40* (2013.01)

(58) Field of Classification Search
CPC . F02D 41/0025; F02D 41/22; F02M 25/0222; F02M 25/0227; F02M 25/028; F02M 35/10157; F02M 35/10268
See application file for complete search history.

(56) References Cited

U.S. PATENT DOCUMENTS

| | | | |
|---|---|---|---|
| 4,611,557 A * | 9/1986 | Hierzenberger | F01N 3/05 123/25 B |
| 6,073,446 A * | 6/2000 | Aeffner | F02B 29/0468 60/599 |
| 6,301,888 B1 * | 10/2001 | Gray, Jr. | B01D 53/9495 123/568.11 |
| 7,251,937 B2 | 8/2007 | Appleton | |
| 7,451,750 B1 * | 11/2008 | Fox | F02B 29/0468 123/568.12 |
| 7,886,724 B2 * | 2/2011 | Tai | F02B 29/0412 123/542 |
| 7,980,076 B2 | 7/2011 | Buia et al. | |
| 8,061,135 B2 | 11/2011 | Rutherford | |
| 9,140,178 B2 | 9/2015 | Pursifull | |
| 9,181,853 B2 | 11/2015 | Leone et al. | |
| 9,297,296 B2 | 3/2016 | Kuske et al. | |
| 2004/0079079 A1 | 4/2004 | Martin et al. | |
| 2007/0028640 A1 | 2/2007 | Hampton | |
| 2007/0277792 A1 | 12/2007 | Durand | |
| 2008/0190079 A1 | 8/2008 | Cerdes | |
| 2010/0229549 A1 * | 9/2010 | Taylor | F02B 29/0468 60/599 |
| 2011/0094219 A1 * | 4/2011 | Palm | F02B 29/0468 60/599 |
| 2013/0019845 A1 | 1/2013 | Meyer | |
| 2013/0067913 A1 | 3/2013 | Nishio et al. | |
| 2014/0041381 A1 * | 2/2014 | Kuske | F02B 37/00 60/602 |
| 2015/0027114 A1 * | 1/2015 | Ino | F02M 35/10268 60/599 |
| 2015/0176480 A1 | 6/2015 | Maceroni et al. | |

FOREIGN PATENT DOCUMENTS

| | | |
|---|---|---|
| CN | 201943801 U | 8/2011 |
| CN | 202732100 U | 2/2013 |
| EP | 2161430 A1 | 3/2010 |
| JP | S57151019 A | 9/1982 |
| WO | 2007069972 A1 | 6/2007 |
| WO | 2009045154 A1 | 4/2009 |

OTHER PUBLICATIONS

State Intellectual Property Office of the People's Republic of China, Office Action and Search Report Issued in Application No. 201410775572.7, dated Mar. 19, 2018, 9 pages. (Submitted with Partial Translation).

* cited by examiner

SYSTEM AND METHODS FOR ENGINE AIR PATH CONDENSATION MANAGEMENT

CROSS REFERENCE TO RELATED APPLICATIONS

The present application is a continuation of U.S. patent application Ser. No. 14/137,402, entitled "SYSTEM AND METHODS FOR ENGINE AIR PATH CONDENSATION MANAGEMENT," filed Dec. 20, 2013, the entire contents of which are hereby incorporated by reference for all purposes.

FIELD

The field of the disclosure relates to detection of contaminants in condensate, formed naturally, and collected in a Charge Air Cooler coupled to an engine intake air path and/or exhaust air path whereby actions are taken in response to the detection.

BACKGROUND AND SUMMARY

Boosted engines are in common use in which air is compressed by an air compressor powered by either a turbo positioned in the engine exhaust or the engine crankshaft. Compression will increase air temperature. Consequently the compressed air is often routed through a heat exchanger commonly referred to as a charge air cooler before entering the engine air intake. Under high ambient air humidity conditions condensate will form in the heat exchanger. In some prior approaches condensate is always routed into the engine exhaust and in other prior approaches condensate is always routed into the engine air intake.

The inventors herein have recognized that always routing the condensate to either the exhaust or the air intake regardless of engine operating conditions and regardless of whether there are contaminants in the condensate has led to undesirable engine or catalyst operation. For example, always routing condensate to the air intake may result in rough engine operation. And always routing condensate to the exhaust upstream of a catalyst at low or moderate engine loads may result in undesired catalyst cooling. Further, if engine oil is present in the condensate routing the condensate to the catalyst may result in undesired catalyst operation. Further, throwing away the engine oil by dumping it into the engine exhaust downstream of the catalyst is undesirable from an emissions or efficiency perspective.

The inventors herein have solved these issues by a method, in one example, which comprises: routing air through a heat exchanger and into combustion chambers of the engine; forming condensate in the heat exchanger; and routing the condensate to either the combustion chambers or a position in the engine exhaust based upon both the type of contaminate detected within the condensate and operating parameters of the engine or the catalyst. For example, in one embodiment a CAC may incorporate a specific geometry designed into the inlet tanks in order to separate condensate from the air path, and further direct the condensate to either the combustion chambers or a position in the engine exhaust based upon the type of contaminate present. In one particular aspect, when the engine is operating at a high load and engine oil is not present in the contaminate, the condensate is routed into the engine exhaust upstream of the catalyst to cool the catalyst. In another example, when the engine is operating at a high load and engine oil is present in the contaminate, the condensate is routed into the engine combustion chambers to combust the oil without contaminating the catalyst. In still another aspect, engine power is reduced when engine coolant is in the condensate to allow the operator to drive to a safe place without harming the engine.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIGS. 3, 4, 9-12, and 15-16 are drawn approximately to scale, although other relative sizing and positioning may be used.

DETAILED DESCRIPTION

Figure 1:
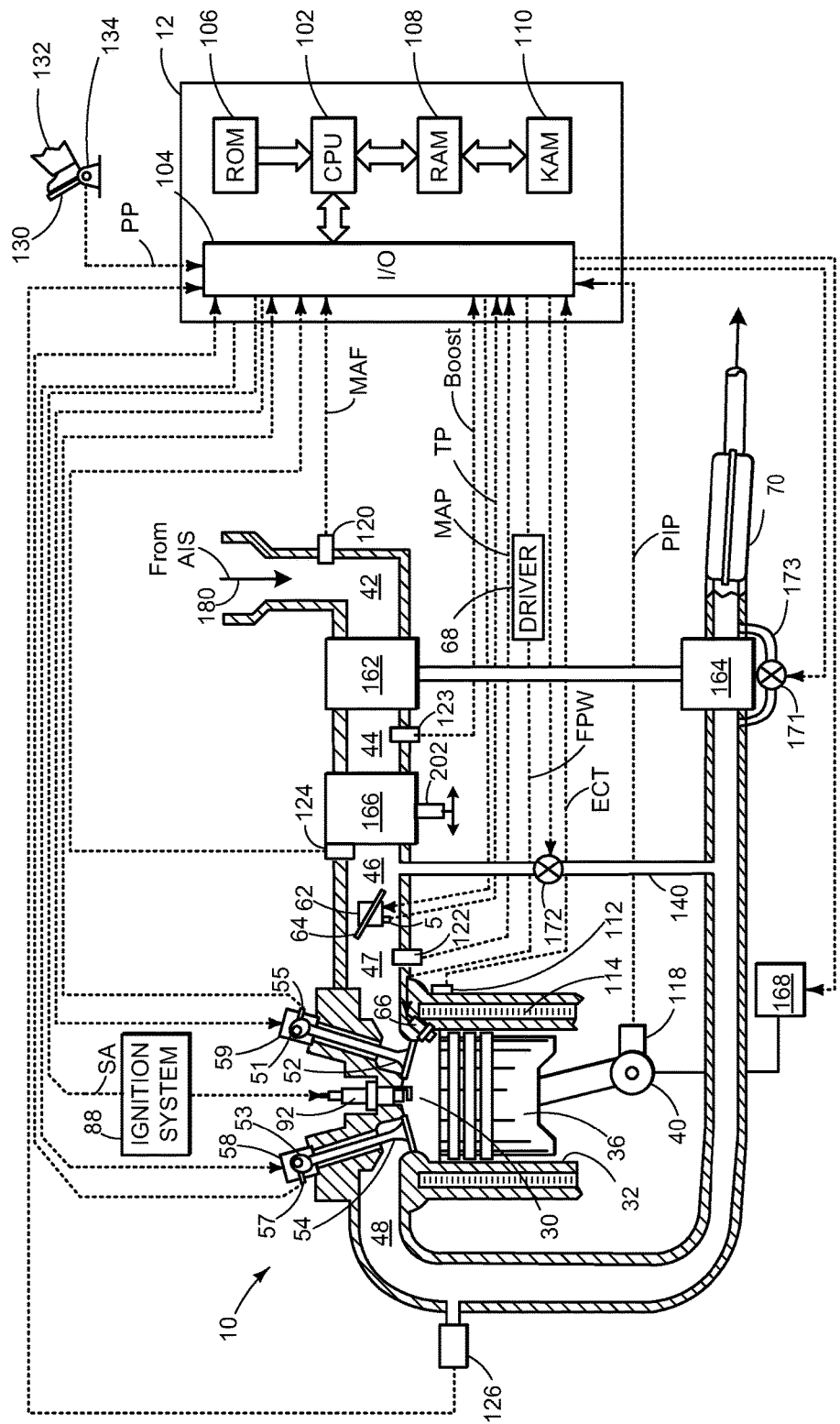
FIG. 1 is a schematic diagram of an example engine system including a charge air cooler.
Figure 5:
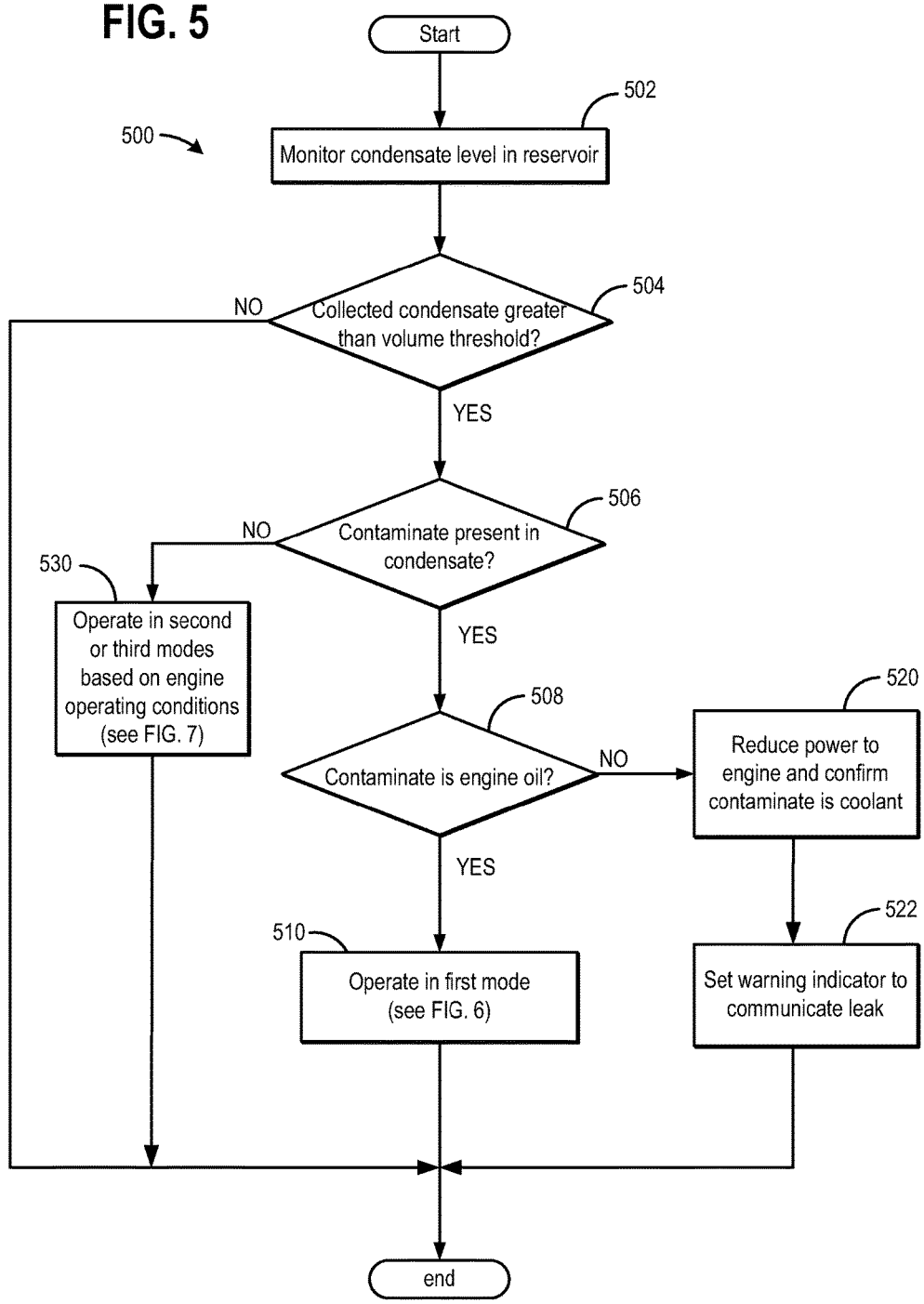
FIG. 5 is flow chart of an example method for switching between operational modes to adjust the location where condensate is routed, responsive to the engine operating conditions.
Figure 6:
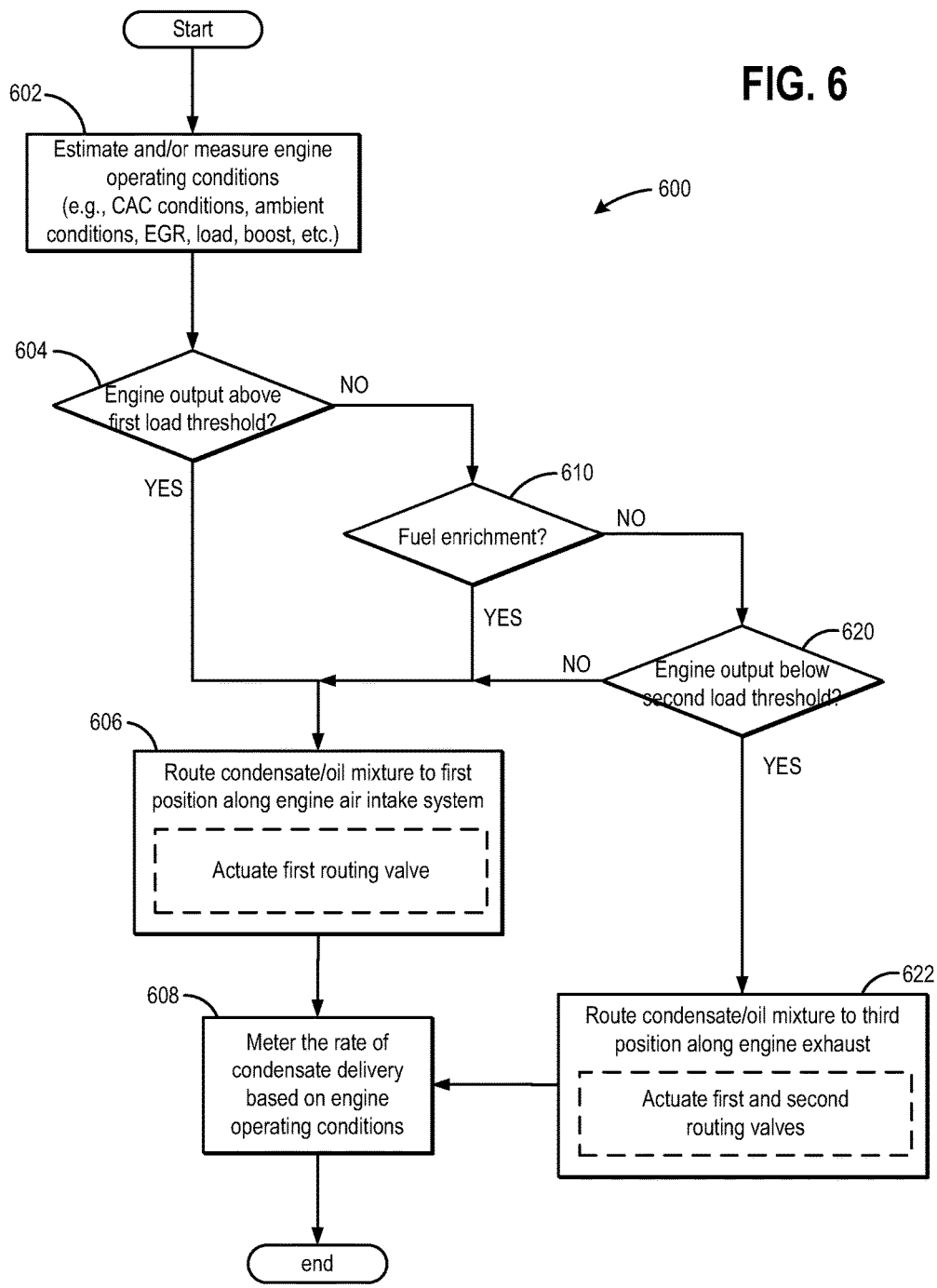
FIG. 6 is a flow chart of the first operational mode illustrating an example method for routing the condensate to engine air intake.
Figure 7:
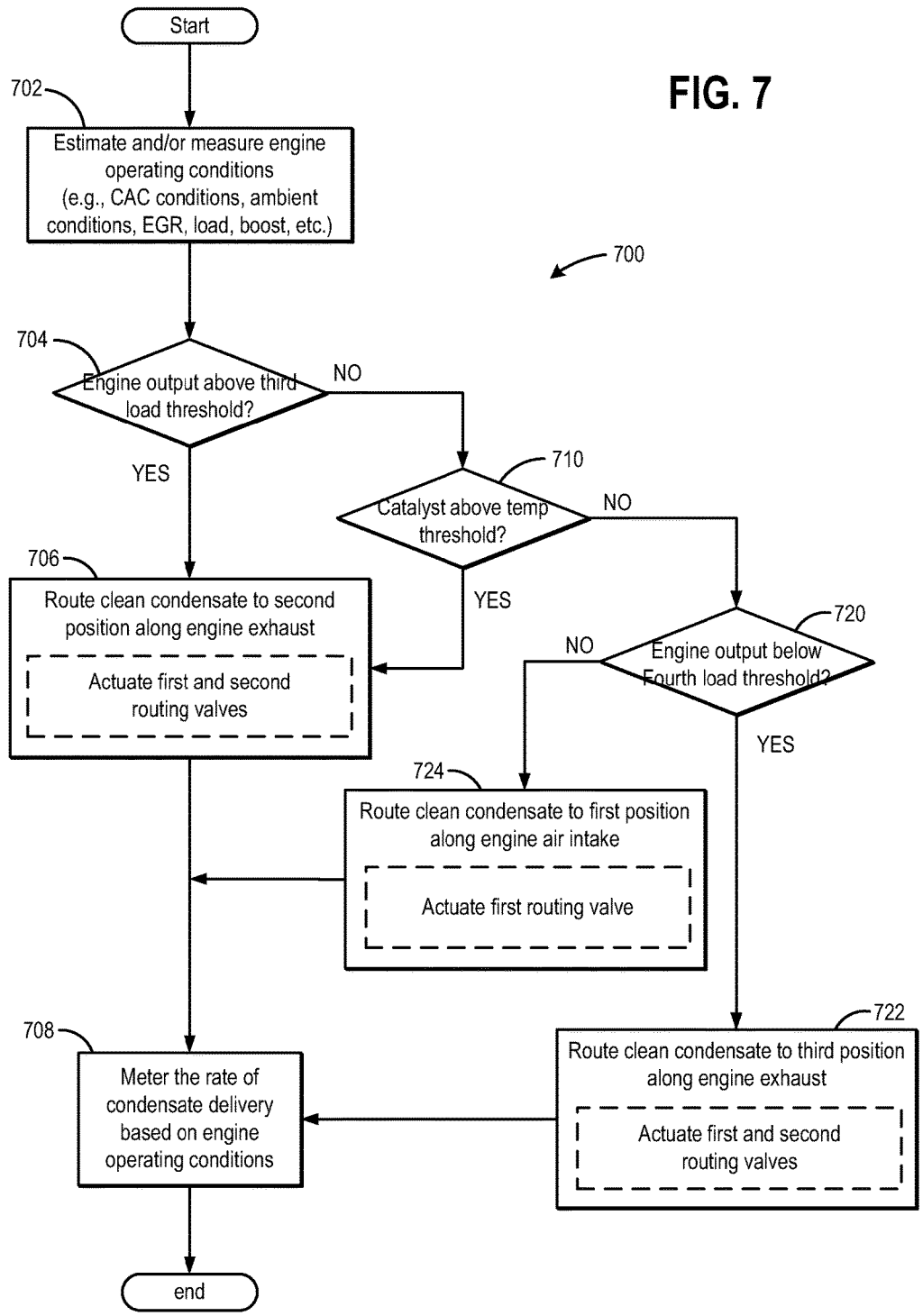
FIG. 7 is a flow chart of the second and third operational modes illustrating an example method for routing the condensate to the engine exhaust.
Figure 8:
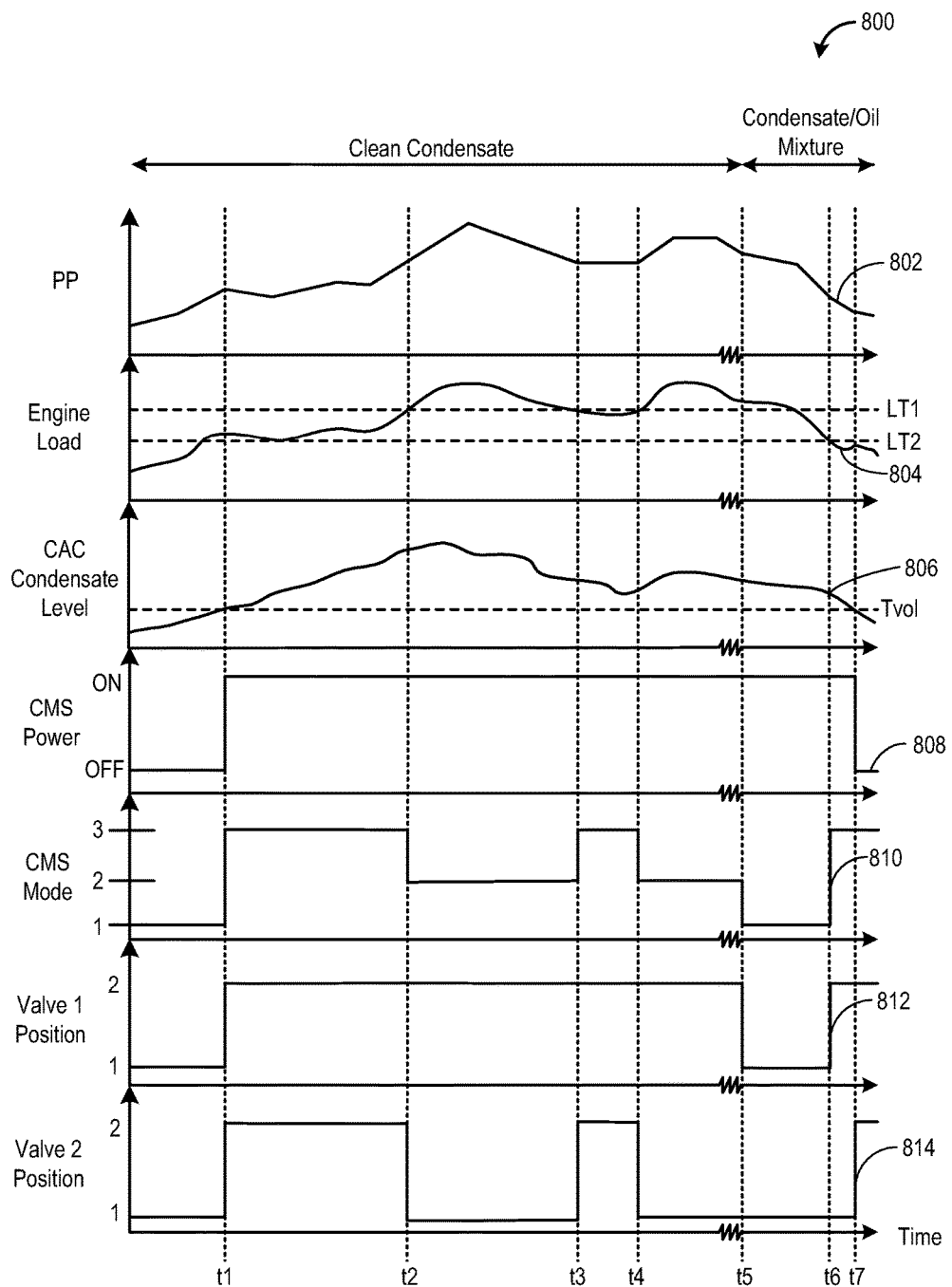
FIG. 8 is a graph showing example valve adjustments based on engine operating conditions.
Figure 13:
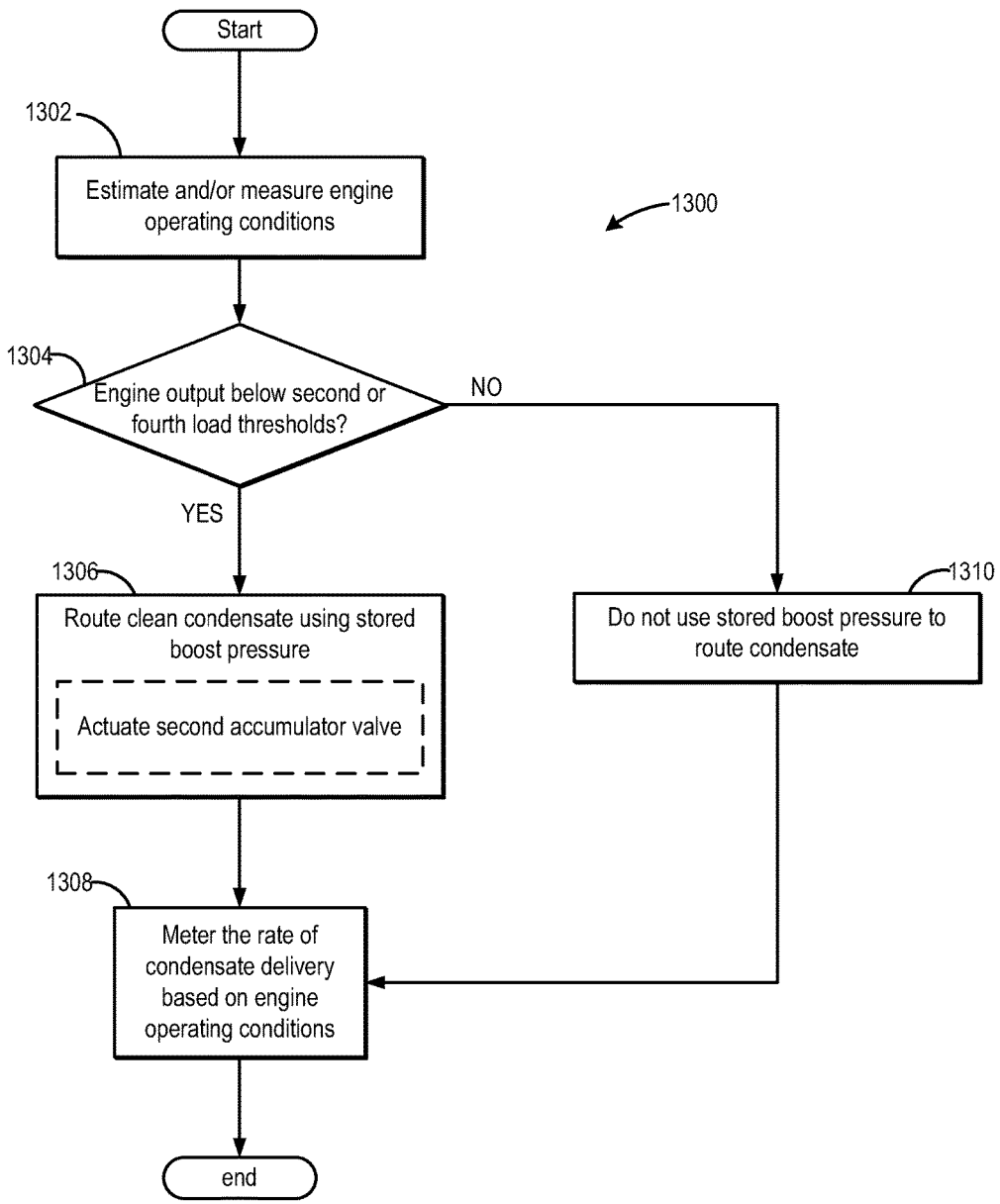
FIG. 13 illustrates an example method for routing condensate using the accumulator.
Figure 14:
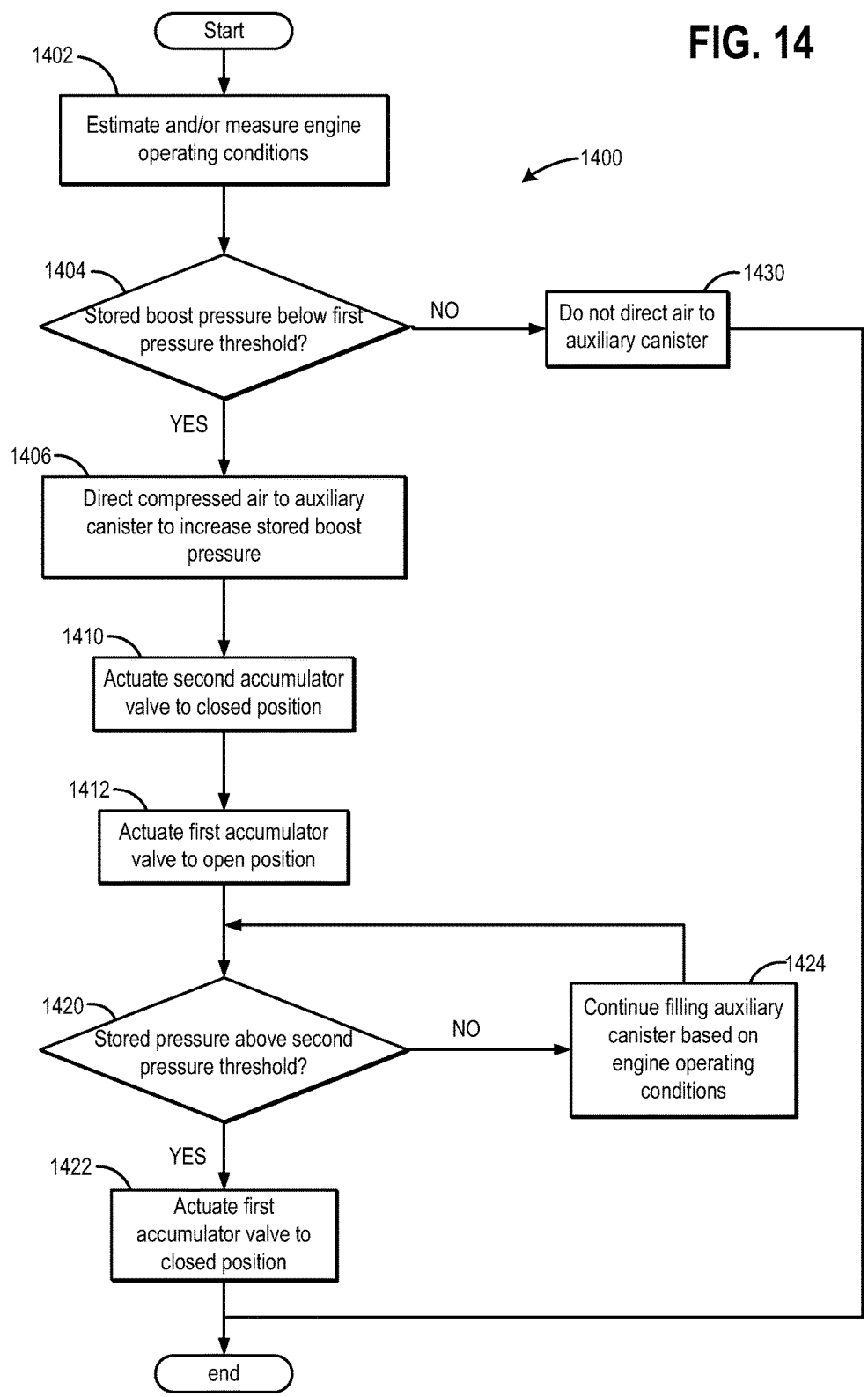
FIG. 14 illustrates an example method for filling the accumulator with pressurized gas.
Figure 15:
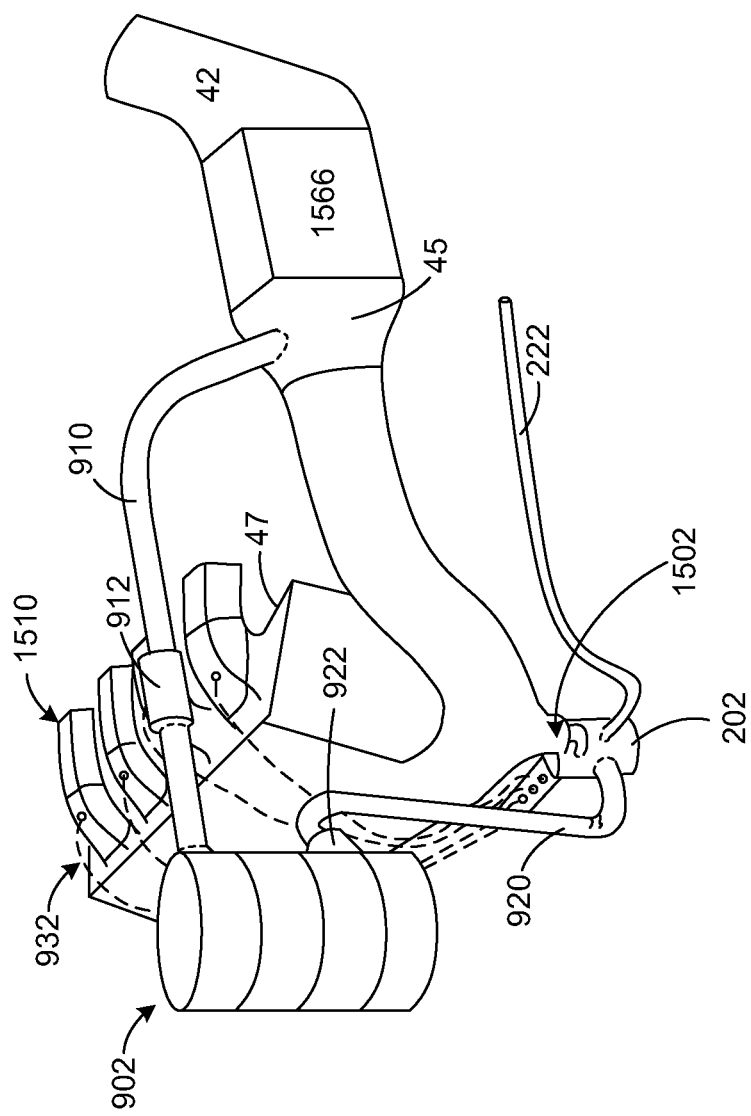
FIGS. 15 and 16 show a third embodiment of the condensation management system wherein condensate collects within the intake manifold.
Figure 16:
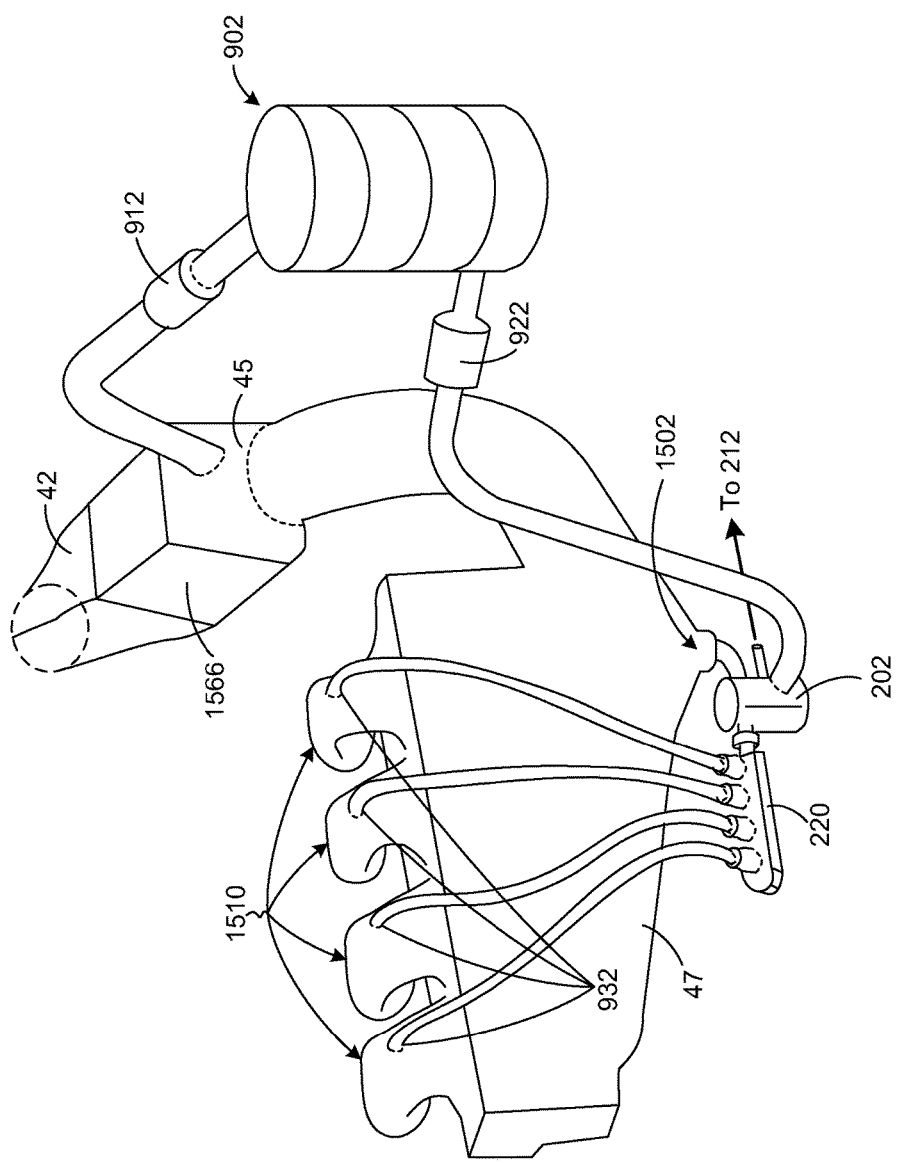

The following description relates to systems and methods for addressing condensate in a charge air cooler (CAC), including adjusting the location where condensate is routed within an engine system, such as the system of FIG. 1. Therein, one or more valves may be adjusted to control the location where condensate is routed, such as the example pathways shown in FIG. 2. In one particular embodiment shown in FIGS. 3 and 4, a twin turbo boosted engine is configured to deliver the condensate to various locations based on the type of contaminate present in the condensate and other operating parameters of the engine or catalyst. For example, the engine operating conditions may include catalyst or engine temperature and condensate formation within the CAC, which may be determined using the method illustrated in FIG. 5. Example methods for switching between engine operating modes to adjust the delivery pathway are shown at FIGS. 6 and 7. Then, FIG. 8 shows an example graph to illustrate valve adjustments in the example engine system. A second embodiment of the condensation management system with an accumulator for storing and using pressurized gas to aid in the routing and movement of said condensate is shown in FIGS. 9-12 while FIGS. 13 and 14 show example methods for operating the condensation management system with said accumulator. In addition, because the lowest point in the engine system can reside at locations other than the charge air cooler, FIGS. 15 and 16 show a third embodiment wherein condensate is collected in the intake manifold that comprises the lowest point in the air intake system.

Referring now to FIG. 1, internal combustion engine 10, comprising a plurality of cylinders, one cylinder of which is shown in FIG. 1, is controlled by electronic engine controller 12. Engine 10 includes combustion chamber (cylinder) 30 and cylinder walls 32 with piston 36 positioned therein and connected to crankshaft 40. Combustion chamber 30 is shown communicating with intake manifold 47 through intake runners (not shown) and exhaust manifold 48 via respective intake valve 52 and exhaust valve 54. Each intake and exhaust valve may be operated by an intake cam 51 and an exhaust cam 53. The opening and closing time of exhaust valve 54 may be adjusted relative to crankshaft position via cam phaser 58. The opening and closing time of intake valve 52 may be adjusted relative to crankshaft position via cam phaser 59. The position of intake cam 51 may be determined by intake cam sensor 55. The position of exhaust cam 53 may be determined by exhaust cam sensor 57. In this way, controller 12 may control the cam timing through phasers 58 and 59. Variable cam timing (VCT) may be either advanced or retarded, depending on various factors such as engine load and engine speed (RPM).

Fuel injector 66 is shown positioned to inject fuel directly into combustion chamber 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In one example, a high pressure, dual stage, fuel system is used to generate higher fuel pressures. In addition, intake manifold 47 is shown communicating with optional electronic throttle 62 which adjusts a position of throttle plate 64 to control air flow from throttle body inlet tube 46. Compressor 162 draws air from air intake 42 to supply the engine aspiration system. Air intake 42 may be part of an induction system which draws in air from one or more ducts (not shown in FIG. 1). The one or more ducts may draw in cooler or warmer air from outside the vehicle or underneath the hood of the vehicle, respectively. An induction valve (not shown in FIG. 1) may then control the location from which intake air is drawn into the induction system. The intake air may travel downstream from the induction valve to the air intake 42, compressor outlet tube 44, CAC 166, throttle body inlet tube 46, intake manifold 47, and the air intake runners to 30 that communicate air to each of the combustion chambers, comprise an air intake system.

Exhaust gases spin turbine 164 which is coupled to compressor 162 which in turn compresses the remaining pre-throttle, air path volume. Various arrangements may be provided to drive the compressor. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. Turbocharger waste gate 171 is a valve that allows exhaust gases to bypass turbine 164 via bypass passage 173 when turbocharger waste gate 171 is in an open state. Substantially all exhaust gas passes through turbine 164 when waste gate 171 is in a fully closed position.

Further, in the disclosed embodiments, an exhaust gas recirculation (EGR) system may route a desired portion of exhaust gas from exhaust manifold 48 to intake manifold 47, or another position along the air intake system, via EGR passage 140. The amount of EGR provided to intake manifold 47 may be varied by controller 12 via EGR valve 172. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger. When operable, the EGR system may induce the formation of condensate from the compressed air, particularly when the compressed air is cooled by the charge air cooler, as described in more detail below. Specifically, EGR contains a large amount of water as it is a combustion by-product. Since EGR is at a relatively high temperature and contains substantial amounts of water, the dew-point temperature may also be relatively high. Consequently, condensate formation from EGR can be much higher than condensate formation from compressing air and lowering it to the dew-point temperature.

The aspiration system may include one or more charge air coolers (CAC) 166 (e.g., an intercooler) to decrease the temperature of the turbocharged or supercharged intake gases. In some embodiments, CAC 166 may be an air-to-air heat exchanger, while in other embodiments CAC 166 may be an air-to-liquid heat exchanger. CAC 166 may include a valve to selectively modulate the flow velocity of intake air, or liquid coolant traveling through charge air cooler 166 in response to condensation formation within the charge air cooler. Hot charge air from compressor 162 enters the inlet of CAC 166, cools as it travels through the CAC, and then exits to pass though throttle 62 and into engine intake manifold 47. To aid in cooling the charge air, ambient air flow from outside the vehicle may enter engine 10 through a vehicle front end and pass across the CAC. Condensate may further form and accumulate in the CAC in response to a decreasing ambient air temperature, high humidity or rainy weather conditions, when the charge air is cooled below the water dew point. Condensate may collect at the bottom of CAC 166, which is then re-introduced to the engine system during an acceleration event at various locations based on the type of contaminate sensed in the condensate and operating parameters of the engine or catalyst.

As described in greater detail below, inlet tank assembly 202 is located at the bottom of CAC 166 at the lowest point where condensation is collected. Inlet tank assembly 202 is coupled to first routing valve 210 that is controlled by the engine control module (e.g., controller 12) and may be activated based on feedback from a sensor located in the sump portion of the inlet tank that monitors condensation and/or contaminate levels therein. With regard to the positioning of the sump portion of the inlet tank, in one embodiment, the sump portion of the inlet tank may be positioned slightly below a plane parallel to the ground that is tangential to the lowest point of the CAC inlet tank tubes. Therefore, the condensation may travel through one or more tubes plumbed to the engine system where it enters an orifice designed to atomize the condensate before injection into the engine system. In particular, the methods described include routing the condensate to either the air intake system or a position in the engine exhaust based upon detecting a contaminate in the condensate in addition to the operating parameters of the engine or catalyst. For example, during vehicle operation, the routing may include, directing the condensate to each of the air intake system and a position in the exhaust system depending on sensed and/or estimated engine parameters during vehicle operation. Furthermore, routing to the various locations described may occur at distinct times, or in some instances may occur concurrently. In addition, the evacuation tube routings may be run parallel to, adjacent to, and/or otherwise travel in the near proximity of existing under hood heat sources in order to heat the liquid media via heat transfer in order to pre-atomize said liquid media. Conversely, evacuation tube routings may be run near cool sources (e.g.,) that may be present along the routing paths in order to provide additional cooling before entering any of the injection point locations. For example, the condensate may be routed to a first position along the engine air intake in a first mode of operation, and a second position along the engine exhaust in a second mode of operation, and a third position along the engine exhaust in a third mode of operation, the first, second, and third modes of operation all being during operation of the vehicle, and all occurring at non-overlapping durations.

By controlling the temperature across the CAC, (e.g., inlet and outlet charge air temperatures) condensate formation may be reduced, which reduces the chance of engine misfire. In one example, by increasing the charge air temperature at the CAC inlet, the air traveling through the CAC may be further away from the condensation point, thereby reducing the amount of condensation. One example of increasing the air temperature at the CAC inlet may include controlling the temperature of the intake air from an induction system. For example, an induction valve may route warmer air from underneath the hood to the induction system and through compressor outlet tube 44 to CAC 166.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of turbine 164 and light-off catalyst 70, which may be a light-off catalyst having a smaller volume than a larger volume catalytic converter that is mounted under the vehicle body. Light-off catalyst 70 is closely coupled to the exhaust manifold or turbocharger (when applied to a IEM cylinder head) and is designed to heat up more rapidly after an engine start than the underbody catalyst. In this particular example, the underbody catalyst is a three-way catalyst which oxidizes hydrocarbons and carbon monoxide, and reduces nitrogen oxides. In this example, the underbody catalyst includes multiple bricks. Other forms of catalytic converters may also be used. The light-off catalyst may be an oxidation catalyst, a three-way catalyst, or other suitable catalyst. Alternatively, a two-state exhaust gas oxygen sensor may be substituted for UEGO sensor 126.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine. The electric motor may be used during purging operations to maintain a driver torque demand.

During operation, each cylinder within engine 10 typically undergoes a four stroke cycle: the cycle includes the intake stroke, compression stroke, expansion stroke, and exhaust stroke. Generally, during the intake stroke, exhaust valve 54 closes and intake valve 52 opens. Air is introduced into combustion chamber 30 via intake manifold 47, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those skilled in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those skilled in the art as top dead center (TDC). In a process hereinafter referred to as fuel injection, fuel is introduced into the combustion chamber. In a process hereinafter referred to as ignition, the injected fuel is ignited by known ignition means such as spark plug 92, resulting in combustion. Spark ignition timing may be controlled such that the spark occurs before (advanced) or after (retarded) the manufacturer's specified time. For example, spark timing may be retarded from maximum brake torque (MBT) timing to control engine knock or advanced under high humidity conditions. In particular, MBT may be advanced to account for the slow burn rate. During the expansion stroke, the expanding gases push piston 36 back to BDC. Crankshaft 40 converts piston movement into a rotational torque of the rotary shaft. Crankshaft 40 may be used to drive alternator 168. Finally, during the exhaust stroke, the exhaust valve 54 opens to release the combusted air-fuel mixture to exhaust manifold 48 and the piston returns to TDC. Note that the above description is provided merely as an example, and that intake and exhaust valve opening and/or closing timings may vary, such as to provide positive or negative valve overlap, late intake valve closing, or various other examples.

In FIG. 1, controller 12 is shown as a microcomputer including: microprocessor unit 102, input/output ports 104, an electronic storage medium for executable programs and calibration values shown as read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a pedal position sensor 134 coupled to an accelerator pedal 130 for sensing force applied by vehicle operator 132; a measurement of engine manifold absolute pressure (MAP) from pressure sensor 122 coupled to intake manifold 47; a measurement of boost pressure (Boost) from pressure sensor 123; a measurement of inducted mass air flow (MAF) from mass air flow sensor 120; a measurement of throttle position (TP) from a sensor 5; and temperature at the outlet of a charge air cooler 166 from a temperature sensor 124. Barometric pressure may also be sensed (sensor not shown) for processing by controller 12. In a preferred aspect of the present description, engine position sensor 118 produces a profile ignition pickup signal (PIP). This produces a predetermined number of equally spaced pulses every revolution of the crankshaft from which engine speed (RPM) can be determined. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. Other sensors not depicted may also be present, such as a sensor for determining the intake air velocity at the inlet of the charge air cooler, for example.

Furthermore, controller 12 may communicate with various actuators, which may include engine actuators such as fuel or condensate injectors, an electronically controlled intake air throttle plate, spark plugs, camshafts, etc. Various engine actuators may be controlled to provide or maintain torque demand as specified by the vehicle operator 132. These actuators may adjust certain engine control parameters including: variable cam timing (VCT), the air-to-fuel ratio (AFR), alternator loading, spark timing, throttle position, etc. For example, when an increase in PP is indicated (e.g., during a tip-in) from pedal position sensor 134, torque demand is increased.

Figure 2:
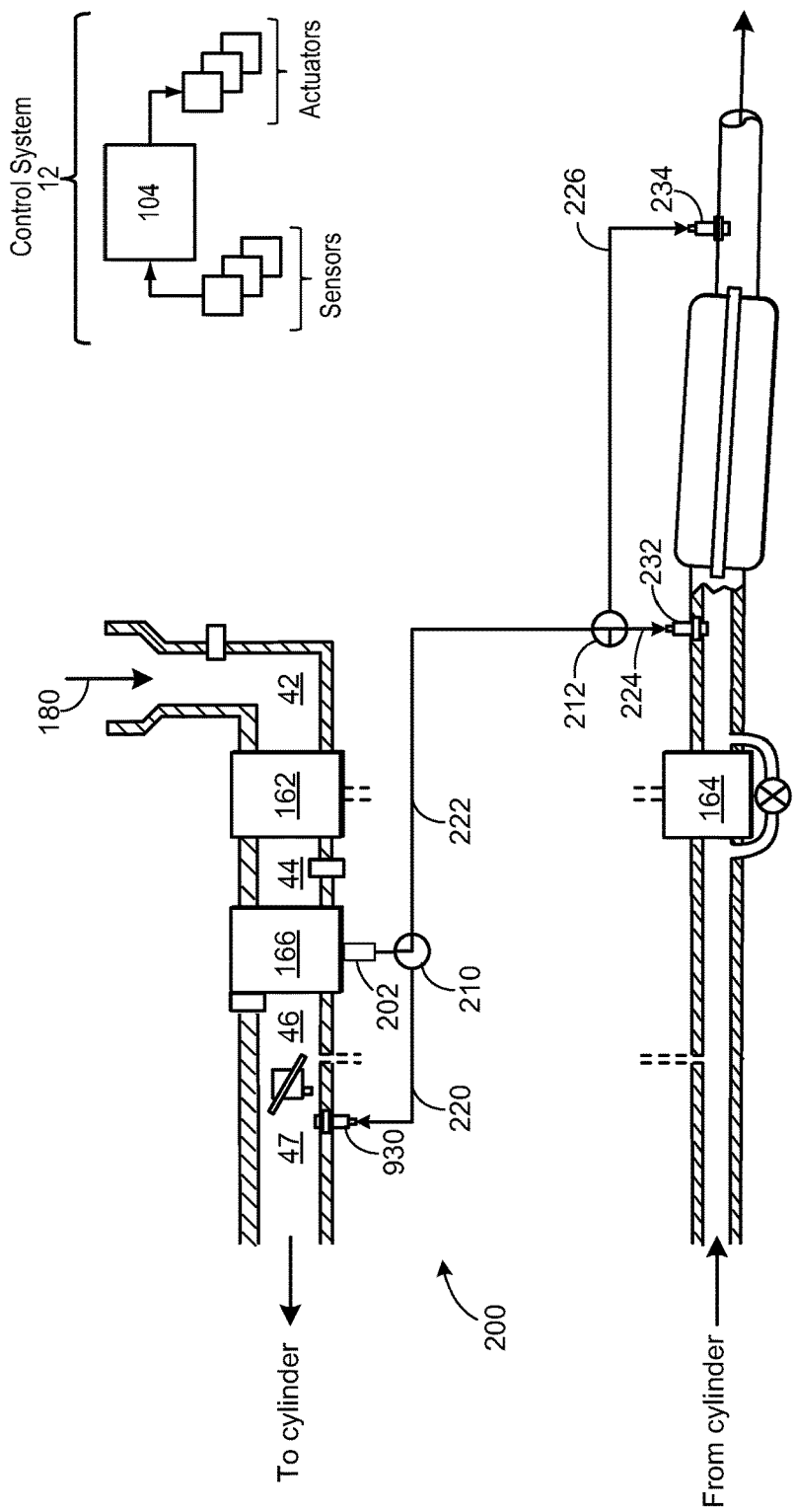
FIG. 2 is a schematic diagram of FIG. 1 showing example condensate pathways.

Now turning to FIG. 2, a simplified schematic diagram of FIG. 1 is shown that includes example condensate pathways according to the present disclosure. For simplicity, condensate management system 200 is shown coupled to a single turbocharger system and single exhaust system. However, in some embodiments, engine 10 may include two or more turbochargers and/or exhaust systems in communication with condensate management system 200. According to the present disclosure, engine 10 includes an air intake system and a catalyst coupled to the engine exhaust. Therein, the method comprises routing air through a heat exchanger and into the air intake system; forming a condensate in the heat exchanger; and routing the condensate to either the air intake system or a position in the engine exhaust based upon a contaminate in the condensate and operating parameters of the engine or catalyst.

For example, as the diagram of FIG. 2 schematically illustrates, condensate may collect at the bottom of CAC 166 in inlet tank assembly 202. Then, based on the composition and/or level of the condensate, it may travel through one or more tubes before injection back into engine 10. Thus, the position of first routing valve 210 that is under the control of control system 12 may be adjusted to route condensate to a first position along the engine air intake system (e.g., intake manifold 47) in a first mode of operation, and to the engine exhaust when not operating in the first mode. In addition, second routing valve 212 is included for routing the condensate to a second position along the engine exhaust upstream of light-off catalyst 70 in a second mode of operation, and to a third position along the engine exhaust downstream of light-off catalyst in a third mode of operation.

With regard to the engine modes shown in the exemplary embodiment of FIG. 2, the first position is in engine intake manifold 47 and the first mode of operation comprises engine operation at a high load with the contaminate including engine oil. Therefore, when a sensor (e.g., condensate sensor 410 described in detail below) detects the presence of engine oil in the condensate, for example, because the engine oil is detected by a sensor coupled to a condensate reservoir, first routing valve 210, which is shown as a two-way valve, may be adjusted to direct the condensate contaminated with engine oil through first pathway 220 where the condensate is atomized by first metering valve 930 before it enters the intake air stream for delivery into cylinder 30. Thereby, the engine oil may be more substantially burned during the combustion process occurring therein. Alternatively, if engine 10 is not operating under a high load, for example, because the load on the engine is below a threshold, but condensate sensor 410 still detects engine oil as the contaminate, engine 10 may still operate in the first mode of operation under fuel enrichment conditions. Operation with excess fuel under fuel enrichment conditions will tolerate induction of the condensate without effecting combustion stability.

Alternatively, if substantially no contaminate is detected by condensate sensor 410, the condensate may be directed to the engine exhaust for injection therein. Therefore, first routing valve 210 may be adjusted to deliver condensate collected at the bottom of CAC 166 through second pathway 222 to the engine exhaust. In addition, because the condensate collected comprises substantially pure water when no contaminate is present, the methods according to the present disclosure include injecting condensate upstream of the catalyst based on one or more engine or catalyst parameters. For example, when the catalyst becomes hot because a temperature is greater than a threshold, the condensate may be injected into the exhaust system upstream of light-off catalyst 70 for delivery therein. Therefore, the condensate may be routed into the engine exhaust upstream of the catalyst in order to cool the device while the load on the engine is high. In this way, the methods according to the present disclosure advantageously use moisture collected within the engine system to increase the efficiency of the charge air cooling system. Accordingly, with regard to FIG. 2, second routing valve 212 may therefore be adjusted to direct the condensate within the exhaust system. Because two positions are present within the exhaust system, herein the second position is the location upstream of the catalyst and the third position is the location downstream of the catalyst.

The second mode of operation comprises injecting condensate at the second position that is along the engine exhaust upstream of the catalyst while engine 10 operates at a high load with said contaminate being substantially free of engine oil. Therefore, when the load on the engine is high (e.g., above a load threshold), the catalyst temperature may increase in response to the high load such that the catalyst temperature becomes greater than a temperature threshold. When this occurs, second routing valve 212 may be actuated to direct condensate through third pathway 224 and into second metering valve 232 that is located in said second position. As described above, the condensate may thereby act to cool the catalyst while the load on the engine is high. In addition, the second mode of operation further comprises the catalyst operating at a temperature inferred to be above a predetermined temperature while the contaminate is substantially free of engine oil. The catalyst temperature may be inferred from one or more of the following variables: combustion air/fuel ratio, exhaust gas recirculation, engine speed, ignition timing, and airflow through the engine. For example, U.S. Pat. No. 5,303,168 teaches a method for predicting engine exhaust gas temperature during engine operation. Therein, various engine information is processed to dynamically predict the exhaust temperature based on vehicle operations using predictive models while the engine speed, load, spark advance, exhaust gas recirculation percent and air/fuel ratio vary.

The third mode of operation comprises injecting condensate at the third position that is along the engine exhaust downstream of the catalyst while engine 10 operates at a low load and no significant engine oil is detected in the condensate. Therefore, when the load on the engine is low (e.g., below a threshold), the catalyst temperature may also fall below a temperature threshold. When this occurs, second routing valve 212 may be actuated to direct condensate through fourth pathway 226 and into third metering valve 234 that is located in the third position downstream of light-off catalyst 70. Upon traveling through second pathway 222, and further through fourth pathway 226, third metering valve 234 may atomize the condensate before it enters the exhaust air stream post light-off catalyst. This may be done in order to protect the light-off catalyst from being exposed to excess moisture during vehicle operations. Further, while operating at light engine loads, injecting condensate upstream of the catalyst could cause undesired cooling of the catalyst and less efficient catalytic operation.

Although the system and methods described herein may freely operate in any of the positions based on one or more engine and/or catalyst parameters, the third mode of operation wherein the condensate is routed to the third position may occur more often than the operation in the second mode wherein the condensate is routed to the second position or the operation in the first mode wherein the condensate is routed to the first position. As such, the condensate comprising substantially pure water may be safely purged from the engine system while the engine operates under reasonable engine loads. In addition, the inventors have recognized that always routing condensate to either the exhaust or air intake regardless of engine operating conditions and regardless of whether there are contaminants in the condensate has led to undesirable engine or catalyst operation, which is thereby avoided by using the system and methods according to the present disclosure.

In some instances, the contaminant detected within the condensate may be engine coolant. However, detection of engine coolant within the condensate signifies potential issues within the engine system since a coolant leak is likely present. Therefore, when the contaminate detected is engine coolant, the described methods further comprise reducing power to the engine to allow the operator to drive to a safe place without harming the engine. In this way, the described system and methods allow for a limp home mode to allow the vehicle to be operated under a restricted set of conditions until arrival at a destination where the vehicle may be parked until maintenance is performed on the vehicle to remedy the potential issue.

Engine system 10 may further include control system 14 comprising controller 12 that is shown receiving information from a plurality of sensors (various examples of which are described herein) and sending control signals to a plurality of actuators (various examples of which are described herein). As one example, sensors may include condensate sensor 410 coupled to inlet tank assembly 202, sensors in the intake, exhaust gas sensor and temperature sensors located in the exhaust and/or catalyst, etc. Other sensors such as pressure, temperature, fuel level, air/fuel ratio, and composition sensors may be coupled to various locations in engine 10. As another example, the actuators may include condensate metering valves 930, 232, and 234, fuel injector 66, and throttle 62. The controller may receive input data from the various sensors, process the input data, and trigger the actuators in response to the processed input data based on instructions or code programmed therein corresponding to one or more routines. Example routines are shown in FIGS. 5-7.

Figure 3:
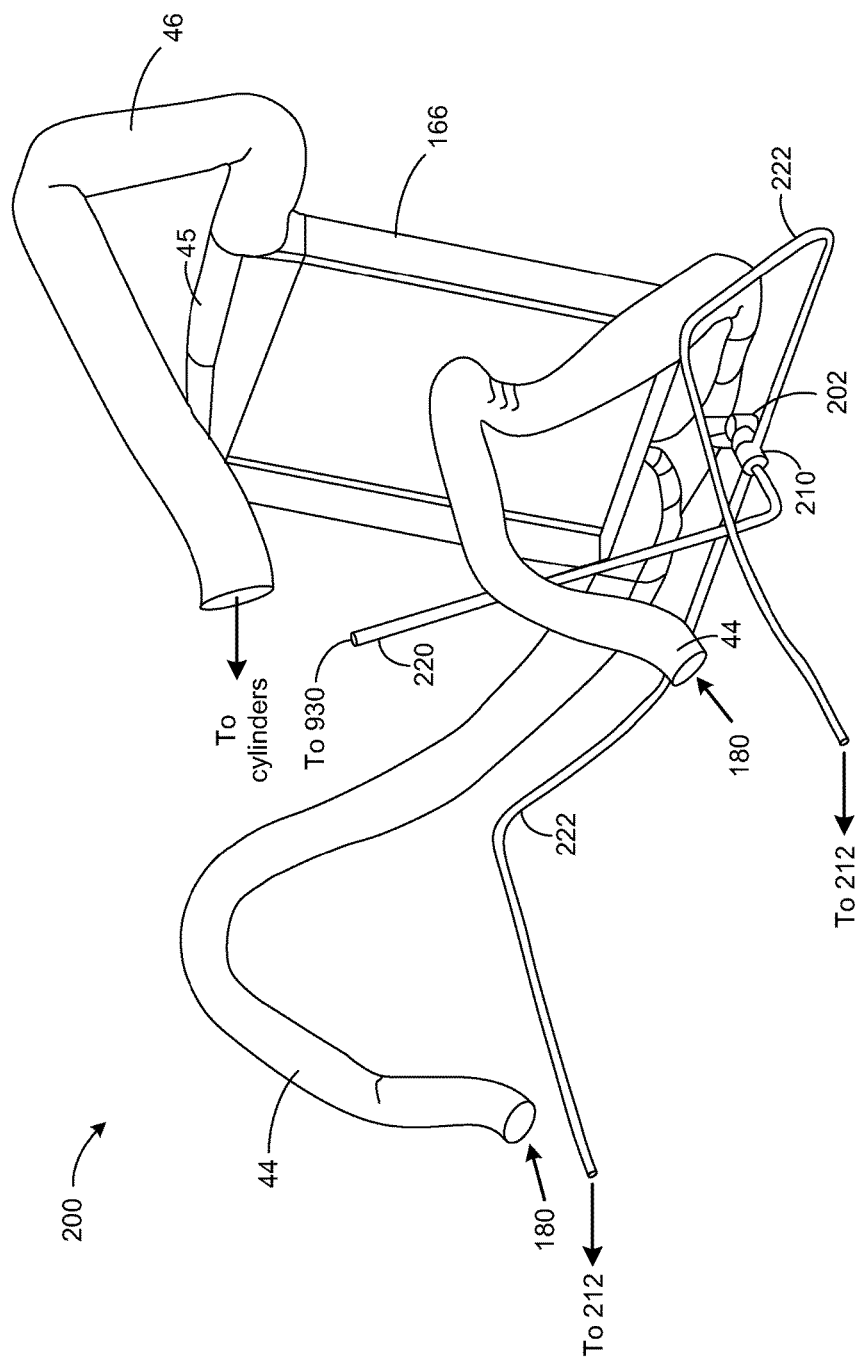
FIG. 3 is an example dual intake system including a heat exchanger and reservoir according to the present disclosure.

Turning now to FIGS. 1-3, which shows the relative positioning of components in an example twin turbo engine (e.g., two turbochargers and two exhaust manifolds) comprising a condensate management system that includes a heat exchanger and reservoir according to the present disclosure. As shown, inlet tank assembly 202 is located below CAC 166 at the lowest point where condensation will collect. Therefore, as air enters each turbocharger compressor inlet identified at 180, airflow through intake passage 42 may be directed to compressor 162 and continue through compressor outlet tube 44 in the manner described above with respect to FIGS. 1 and 2. At CAC 166, both airflows are combined into a single airflow that is forced through said heat exchanger. Thereafter, the compressed and cooled airflow is directed through the throttle body inlet tube 46, through the intake manifold 47 and into the intake runners, ultimately reaching combustion chambers 30. To aid in cooling the charge air, an ambient air flow from outside the vehicle may enter engine 10 through a vehicle front end as it is further passed across CAC 166.

As indicated in FIG. 3 and described above, inlet tank assembly 202 is located below CAC 166 for collecting condensate as it forms within the air intake system. However, because the condensate management system shown in FIG. 3 is coupled to a system with two exhaust manifolds (not shown), in some instances, first routing valve 210 may be a three-way valve configured to direct condensate collected to the engine intake system via first pathway 220 or to simultaneously direct collected condensate to each engine exhaust system via two second pathways 222. Although condensate flow to each engine exhaust through second pathway 222 may occur simultaneously, this is non-limiting and in some embodiments, condensate may be directed to one or the other exhaust manifolds based on the needs therein. For example, if one exhaust pipe is designed to carry a heavier load, for instance, because it has an extra catalyst present, condensate may be routed to that exhaust system more frequently compared to the other exhaust system. For simplicity, herein each exhaust system is substantially identical so the load carried by each is uniformly distributed between the two exhaust manifolds. As such, the flow of condensate to each exhaust manifold may generally occur in proportion to one another. Furthermore, as described with respect to FIG. 2, condensate routed to the exhaust system may travel through second pathway 222 en route to second routing valve 212.

Figure 4:
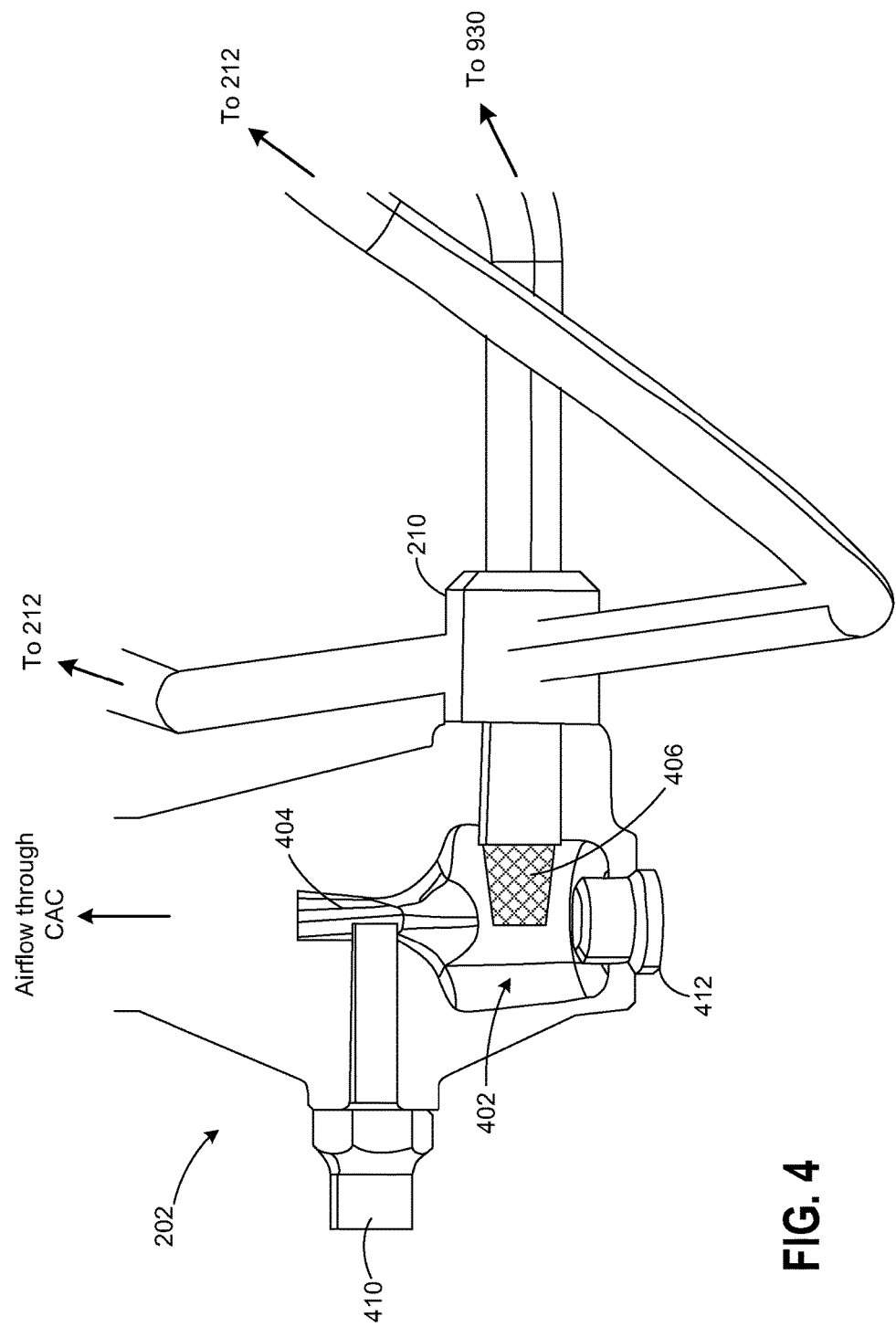
FIG. 4 shows an example reservoir and metering valve in greater detail.

FIG. 4 shows example inlet tank assembly 202 in greater detail. In one embodiment, inlet tank assembly 202 includes a single sensor for determining whether a contaminate is present in the condensate. However, this is non-limiting, and in other embodiments, two or more sensors may also be present to detect one or more contaminates in addition to a clean condensate. For example, three sensors may be included to determine whether the condensate is substantially free of contaminates, whether engine oil is present as the contaminate, and/or whether the contaminate is engine coolant. Therefore, as shown in FIG. 4, condensate sensor 410 may discriminate between these three fluids. For instance, the condensate may be analyzed for a specific gravity or hydrocarbon signature of the condensate media since engine coolant contains ethylene glycol that exhibits a different hydrocarbon signature than engine oil.

Because inlet tank assembly 202 is located below CAC 166, condensate from the charge air cooler may flow downward to the lowest point that coincides with internal sump 402 where the condensate is collected. For this reason, communication port 404 joins both left and right fluid channels together, to effectively funnel condensate within CAC 166 into internal sump 402 for evacuation. Since the condensate is re-introduced within the engine system, inlet tank assembly 202 further includes filter 406 to restrict any particles or debris from entering the condensation evacuation tube, or condensation management system. Therefore, condensate fluids that proceed further downstream (as shown in FIG. 4) to first routing valve 210 may be cleaner since particulate matter is decreased through use of the filter. In some embodiments, internal sump 402 may include removable plug 412 in order to provide a port for gaining access to the internal sump area. For example, during a testing phase, a camera may be installed in the port to visualize the fluids while one or more sensors determines whether a contaminate is present in the collected condensate. As described in greater detail above with respect to FIG. 3, collected condensate may also be routed to the three positions based on the type of contaminate in the condensate and operating parameters of the engine or catalyst.

Turning to control of the system and methods disclosed, FIGS. 5-7 show example flow charts to illustrate how controller 12 may be programmed to make adjustments within engine 10 to switch between engine operating modes. For example, controller 12 may switch operating modes by actuating one or more routing valves in the condensation management system to adjust the pathway traveled by the condensate as it is routed to the various locations described.

FIG. 5 is flow chart of method 500 for managing engine 10 while switching engine operating modes based on the condensate identity (e.g., whether a contaminate is present). According to the example flow chart shown, method 500 therefore generally includes discriminating between clean condensate comprising substantially all water and condensate contaminated with impurities like engine oil or coolant. Then, depending on the identity of condensate sensed, method 500 further comprises switching between engine operating modes to route the condensate to the locations disclosed in FIG. 2. As described there, method 500 includes compressing air in a compressor driven by a turbo coupled to the engine exhaust upstream of the catalyst; forcing said compressed air through a heat exchanger into the engine air intake; collecting condensate formed by the heat exchanger in a reservoir; and routing said condensate to one of: the engine air intake system; the engine exhaust upstream of the catalyst and downstream of the turbo; or the engine exhaust downstream of the catalyst.

As such, controller 12 may be coupled to inlet tank assembly 202 and specifically condensate sensor 410 to determine whether any condensate has collected within the reservoir. At 502, method 500 therefore includes monitoring condensate levels within the reservoir, e.g., internal sump 402. At 504, method 500 further includes determining whether the volume of condensate collected is greater than a volume threshold. If a substantial amount of condensate has been collected, for example, because the condensate collected is greater than the volume threshold, the method may further determine the purity of the condensate collected within the reservoir. Alternatively, if the amount of condensate collected falls below the volume threshold, in the embodiment described engine 10 may continue operating while controller 12 monitors condensate conditions within the reservoir. For simplicity, while the volume of condensate falls below the volume threshold, herein the flow of condensate is ceased. However, in some embodiments controller 12 may optionally route condensate collected within the reservoir based on the engine conditions regardless of the volume collected so long as some condensate is present in the reservoir.

With respect to the purity of condensate sensed, at 506, method 500 includes determining whether a contaminate is present in the condensate. As described briefly above with respect to FIG. 2, at 508, method 500 further comprises determining whether the contaminate is engine oil. If the contaminate is engine oil, at 510, engine 10 may operate in the first operating mode by routing condensate to the first position located in the engine intake manifold. FIG. 6 shows an example flow chart illustrating how controller 12 may operate the condensate management system in the first operating mode based on the engine operating conditions when the contaminate is engine oil.

In some instances, the contaminate may be engine coolant. Therefore, method 500 further includes determining whether coolant is present within the condensate. For example, condensate sensor 410 may be configured to discriminate between engine oil and coolant by accounting for the specific gravity of each substance, which may be different due to a different hydrocarbon signature of the media. For instance, engine coolant may contain ethylene glycol and therefore have a different hydrocarbon signature than engine oil that may contain hydrocarbons having up to 34 carbon atoms per molecule. In addition, although many motor oils have between 18 and 34 hydrocarbons per molecule, this is non-limiting and in some cases more than 34 carbon atoms may be present per molecule. For this reason, if the contaminate sensed is not engine oil, at 520, method 500 includes reducing power to the engine since the contaminate is likely to be engine coolant. Furthermore, because an engine coolant contaminate is indicative of a leak within the engine system, and is therefore indicative of potential issues, the method further comprises confirming that the contaminate is coolant, for example, by analyzing the hydrocarbon signature collected from condensate sensor 410. Upon confirmation, at 522, method 500 includes setting a warning indicator such as a dashboard light to communicate that a leak is present within the engine system. Moreover, the method comprises reducing power to the engine when engine coolant is present in the condensate to allow the operator to drive to a safe place without harming the engine. This limp home mode of operation thereby allows the degraded engine system to be driven to safety until the vehicle can be taken to a repair facility to address or fix the potential issue.

Returning to 506, if no contaminate is detected in the condensate such that the condensate is a substantially clean liquid (e.g., water), then the method may proceed to 530 wherein the engine operates in the second or third modes by routing condensate into the engine exhaust either upstream or downstream of the catalyst, respectively. FIG. 7 shows an example flow chart illustrating how controller 12 may operate the condensate management system in the second or third operating modes based on the engine operating conditions in the absence of contaminates.

Now, turning to the various engine operating modes, FIG. 6 is a flow chart of method 600 that illustrates the first mode for routing the condensate to the engine air intake when the contaminate is engine oil. At 602, the routine begins by estimating and/or measuring engine operating conditions.

Engine operating conditions may include engine speed and load, engine temperatures, throttle position, air mass flow, engine airflow rate, CAC conditions (inlet and outlet temperature, inlet and outlet pressure, etc.), ambient temperature and humidity, MAP, and boost level. Condensate formation, such as an amount or volume of condensate in the CAC, may be determined based on this data at 602. In one example, a rate of condensate formation may be determined within the CAC based on ambient temperature, CAC outlet temperature, CAC outlet pressure ratio to ambient pressure, air mass flow, EGR, and humidity. The rate may then be used to calculate the amount or level of condensate in the CAC. In another example, a condensation formation value may be mapped to CAC outlet temperature and a ratio of CAC pressure to ambient pressure. In an alternate example, the condensation formation value may be mapped to CAC outlet temperature and engine load. Engine load may be a function of air mass, torque, accelerator pedal position, and throttle position, and thus may provide an indication of the air flow velocity through the CAC. For example, a moderate engine load combined with a relatively cool CAC outlet temperature may indicate a high condensation formation value, due to the cool surfaces of the CAC and relatively low intake air flow velocity. The map may further include a modifier for ambient temperature. However, as described herein, the amount of condensate present in inlet tank assembly 202 may be measured by a single sensor.

At 604 the routine determines if the engine output is above a first load threshold (e.g., because engine RPM's are greater than a desired output). If the engine load is high, at 606, the routine includes activating first metering valve 930 and routing the condensate/oil mixture there through along a first position in the engine air intake system. As one example, controller 12 may adjust the flow of condensate by adjusting first routing valve 210 to a first position that allows the condensate to flow from inlet tank assembly 202 through first pathway 220 and into first metering valve 930. Although routing valve 210 can assume one of two positions as shown in FIG. 2 (e.g., because it is two-way valve), other valve configurations comprising more pathways for diverting the flow of condensate within the condensate management system are possible. However, for simplicity, catalyst locations described herein allow for increased savings since less material is used for routing the condensate throughout the evacuation tubes/lines. In addition to controlling the direction or pathway of condensate flow, the condensate management system may further control the rate of delivery in order to prevent or manage condensation build-up during conditions in which condensation is produced, such as during rain or high humidity. Thus, at 608, method 600 includes metering the rate of condensate delivery based on one or more engine operating conditions. Furthermore, when the engine is operating at a high load and engine oil is present in said condensate, the method may include routing said condensate into the engine air intake system at an increased rate of delivery since it is likely to be collected at a higher rate.

Returning to 604, method 600 includes making further adjustments to route the condensate into the air intake when engine oil is present in the condensate and the engine is operating under fuel enrichment conditions, even though the load on the engine is low or moderate. Therefore, even though the output of the engine falls below the first load threshold, at 610, the routine further comprises routing the condensate/oil mixture to first metering valve 930 along the engine air intake during fuel enrichment conditions. As described above, this may be done by adjusting the position of first routing valve 210 to direct the flow of condensate through first pathway 220. Alternatively, if the output of the engine is low or moderate and no fuel enrichment is to occur, at 620, method 600 includes determining whether the engine output falls below a second load threshold.

Figure 9:
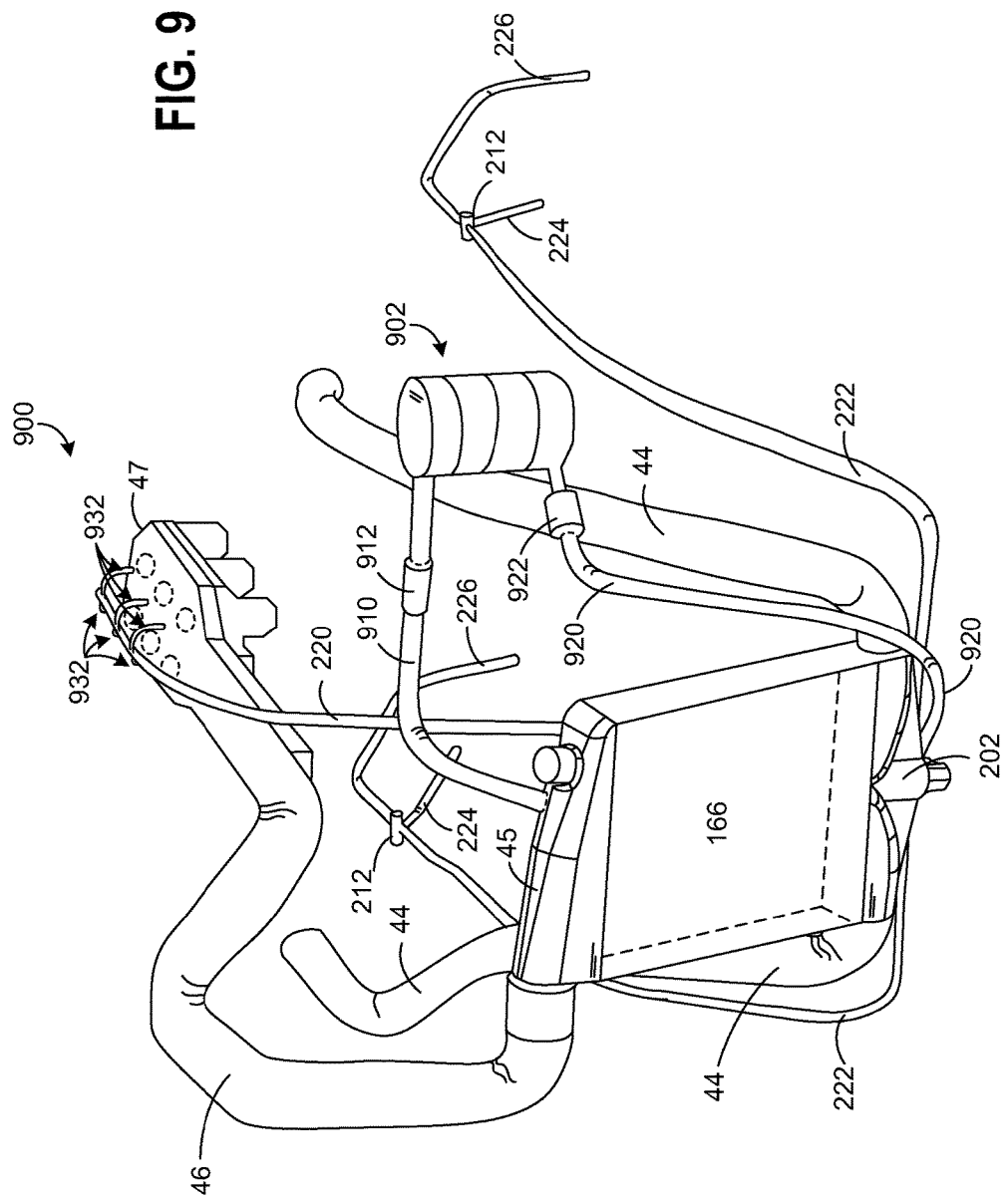
FIGS. 9-12 show an example condensation management system according to a second embodiment wherein an accumulator is included for aiding the routing of said condensate.

When the engine output falls below the second load threshold, and the condensate is introduced at a single location or port; (e.g., at a positive crankcase ventilation or PCV valve location) reduced airflows within the intake system (e.g., due to lower air path velocities) make it more difficult to distribute injected condensate evenly to all of the cylinders since the atomized mixture tends to settle along the floor of the air duct. Conversely, when the engine output is high, increased airflows (e.g., with high air path velocities) allow for the condensate mixture to hang in suspension as the atomized mixture passes through the air ducts, which advantageously reduces distribution challenges. Therefore, to overcome the distribution challenges, in one example, a multi-port system comprising a separate evacuation tube placed directly above each intake port leading to each individual engine cylinder may be utilized. For example, FIG. 9A shows example multi-port system 900 for distributing the routed condensate to each individual cylinder. For simplicity, the location of each evacuation tube relative to each cylinder (e.g., placed directly above) is shown for reference. (e.g., see FIG. 9). Alternatively, in another example, an accumulator may also be included within the condensate management system to assist condensate evacuation to any or all of the evacuation locations (e.g., to the intake and/or exhaust system) when the engine output falls below the second load threshold. In one instance, the accumulator may harvest and store engine boost pressure and/or an engine intake manifold vacuum parameter to be used on demand. Alternatively, at 622, method 600 includes routing the condensate/oil mixture to the third position along the engine exhaust downstream of the exhaust catalyst when the engine output falls below the second load threshold. Moreover, controller 12 may adjust first routing valve 210 and second routing valve 212 in order to adjust the pathway for delivery to the engine exhaust downstream of the catalyst. Alternatively, if the engine output is greater than the second load threshold, controller 12 may route the condensate/oil mixture to the first position along the engine air intake as described above. Therefore, method 600 proceeds to 606 and further comprises metering the condensate while the metered condensate is routed to the intake manifold when the engine is operating at a light or moderate load. For example, as described above, condensate may be routed to the first position at the engine intake system when engine oil is detected in the condensate. Although two load thresholds are herein described, in some instances, the first and second load threshold may be substantially equal such that condensate is simply routed to the engine air intake while the engine operates above the first load threshold and to the engine exhaust while the engine operates below the first load threshold.

With respect to routing of the clean condensate, FIG. 7 shows a flow chart of method 700 that illustrates the second and third operating modes for routing the condensate to the engine exhaust. As described above, at 702, the routine begins by estimating and/or measuring engine operating conditions. Then, at 704, method 700 includes determining whether the engine output is above a third load threshold. The third load threshold indicates engine conditions above which the catalyst is likely to become hot. Therefore, if the catalyst temperature increases, for example, because the engine output is high, at 706 the clean condensate may be routed to the second position along the engine exhaust upstream of the catalyst in order to cool the catalyst by spraying the finely atomized mist into the engine exhaust. As described briefly above, routing the clean condensate to the second position may involve controller 12 adjusting first routing valve 210 and second routing valve 212 to adjust the pathway for delivery of the fluid to the second position. Moreover, depending on the engine conditions detected, at 708, method 700 includes metering the rate of condensate delivery based on one or more engine operating conditions. For example, if the engine load and therefore catalyst temperature increases, the amount of clean condensate injected may be increased to further increase the rate of catalyst cooling. Alternatively, if the engine load decreases, which may cause a decreased catalyst temperature in some instances, the amount of clean condensate injected may be decreased in proportion to the decreased engine load or catalyst temperature. Although not shown, in some embodiments, method 700 may include routing said condensate into the engine exhaust upstream of the catalyst and downstream of the turbo when the engine is operating under fuel enrichment conditions and engine oil is not present in said condensate.

Returning to 704, if the engine output falls below the third load threshold, the temperature of the catalyst may still rise above a temperature threshold based on the engine operating conditions. For example, if a moderate engine load that falls just below the third load threshold is applied for an extended period of time, the temperature of the catalyst may still increase above a temperature threshold that is set to indicate potentially degrading conditions. Therefore, said second mode of operation comprises the catalyst operating at a temperature inferred to be above a predetermined temperature with said contaminate being substantially free of engine oil. As described herein, the catalyst temperature may be measured by a sensor (e.g., a temperature sensor) or inferred from one or more of the following variables: combustion air/fuel ratio, exhaust gas recirculation, engine speed, ignition timing, and airflow through the engine. As such, at 710, if the catalyst temperature is above a temperature threshold, the clean condensate may be routed to the second position along the engine exhaust in the manner described already. Alternatively, if the catalyst temperature falls below the temperature threshold while the load on the engine is moderately low, at 720, the clean condensate may instead be routed to the third position along the engine exhaust as indicated at 722 for discharge to the atmosphere by adjusting the first and second routing valves within the condensation management system. Instead, if the engine output falls below a fourth load threshold, at 724, the clean condensate may be routed to the first position along the engine air intake system by simply adjusting the first routing valve. Thereafter, the rate of condensate delivery may be adjusted based on the engine operating conditions.

Now turning to FIG. 8, graph 800 shows example valve adjustments based on engine operating conditions. Specifically, graph 800 shows changes in routing valve positions in response to changes in pedal position at plot 802, engine output at plot 804, and changes in CAC condensate level at plot 806. Additionally, power to the condensate management system (CMS) is shown at plot 808, while the CMS operating mode is shown at 810. The position of the first routing valve is shown at 812 while the position of the second routing valve is shown at 814. Time is shown along the abscissa of each plot and time increases from left to right. For simplicity, graph 800 shows example valve adjustments during a first time period when condensate sensor 410 detects no contaminates in the collected fluid. Then, example adjustments are shown for a second time period occurring at some later time when condensate sensor 410 has detected an engine oil contaminate in the fluid collected. Although not shown in graph 800, the condensate management system may also detect coolant in the condensate and reduce power to the engine responsive to the coolant detected as was described already.

Prior to time t1, the vehicle speed represented as pedal position (PP, plot 802) and engine load (plot 804) may be low and the throttle opening therefore small. CAC condensate level (plot 806) may therefore fall below a threshold volume. In response to an engine warm-up condition (e.g., engine and catalyst temperature below a temperature threshold), the condensation management system may be inoperable and therefore occupy the off position. However, in other examples, the CMS may simply be on for the entire time duration in which the vehicle is on. Because the condensation level falls below a volume threshold, the routing valves may occupy any position since no condensate is being delivered therethrough. For simplicity, both routing valves are shown in their first positions, respectively. That is, first routing valve 210 is positioned to deliver condensate to the first position, and second routing valve 212 is positioned to deliver condensate to the second position upstream of the catalyst.

Between time t1 and time t2, the level of condensate increases above the volume threshold. Therefore, power is supplied to the CMS device. As such, controller 12 may begin to make adjustments based on the engine operating conditions to deliver the collected condensate to the engine system. In the example shown, the load on the engine falls below the first load threshold identified as LT1 in the figure. Therefore, because the condensate is clean, and because the load on the engine falls below a threshold output, the catalyst temperature is likely to be moderately cool. Responsive to these conditions, controller 12 may thereby operate the CMS in the third operating mode to deliver condensate to the third position by adjusting the pathway to route the clean condensate downstream of the catalyst. As such, the position of first routing valve 210 is adjusted accordingly to the second position in order to route condensate through second pathway 222, while the position of second routing valve 212 is also adjusted to its second position in order to route the condensate through fourth pathway 226. As described above, this mode of operation advantageously discharges the clean condensate to the atmosphere external to the vehicle and comes with a very low probability of engine misfire or hesitation.

The increased engine output between time t2 and time t3 may cause the CAC condensate level to further increase. At time t2, the engine output increases above LT1. Therefore, controller 12 may determine that the engine is to be operated in the second operating mode in order to route the condensate upstream of the catalyst (plot 810). However, because the first routing valve is already in the second position, condensate is already being delivered to the engine exhaust. As such, controller 12 may simply adjust the second routing valve 212 to the first position in order to adjust the pathway for delivery of the condensate to the second position. Then, based on the engine operating conditions (e.g., catalyst temperature), the amount of condensate injected may be adjusted to cool the catalyst by spraying an atomized mist of clean condensate (e.g., water) onto the catalyst via the engine exhaust manifold.

At time t3, the vehicle may decelerate and therefore reduce a load produced by the engine. In response to the engine output falling below LT1, controller 12 may again operate the engine in the third mode to deliver condensate downstream of the catalyst. However, in other instances where the catalyst temperature remains high even though the engine output briefly falls below LT1, controller 12 may be programmed to maintain operation in the second mode to route the condensate upstream of the catalyst. For simplicity, herein, the catalyst temperature follows the engine output (plot 804). At t4, the vehicle again accelerates and thereby increases the load on the engine. In response, controller 12 makes adjustments to operate in the second mode by adjusting the second routing valve to the first position while routing the condensate upstream of the catalyst. Furthermore, sometime between time t4 and time t5, condensate sensor 410 determines that engine oil is present in the condensate.

In response to detecting engine oil, controller 12 may re-route the condensate/oil mixture to the air intake in order to burn the additional combustible material. Therefore, at t5, controller 12 may make adjustments to operate in the first mode to deliver the mixture to the engine air intake (plot 810). Further, controller 12 may accomplish this simply by adjusting first routing valve 210 back to the first position (plot 812) without adjusting second routing valve 212. Once first routing valve 210 has been adjusted to the first position, the condensate mixture will flow through first pathway 220. Therefore, further adjustments to second routing valve 212 serve no functional purpose. For simplicity, in this example, controller 12 simply leaves second routing valve 212 in the same position as was occupied just prior to the detection of the engine oil.

At t6, the engine output falls below the second load threshold (LT2). Therefore, a reduced airflow within the intake system due to lower air path velocities may make it more difficult to distribute the injected condensate/oil mixture evenly to all of the cylinders since the atomized mixture tends to settle along the floor of the air duct. As such, controller 12 may adjust the condensate pathway in order to deliver the mixture to the third position even though discharge of engine oil to the atmosphere may adversely affect engine emissions. On the other hand, a cleaner intake manifold may serve to enhance engine and/or vehicle operations. At t7, the CAC condensate level decreases below the volume threshold. In response, controller 12 may halt condensate delivery operations by turning off the CMS module (plot 808). Thereafter, the vehicle may continue to decelerate while the engine load further decreases.

Turning to the second embodiment, FIGS. 9-14 show engine 10 including an auxiliary canister for storing pressurized air to aid in the routing of condensate under low engine operating conditions. In addition, the second embodiment further includes a passageway for directing condensate to each combustion chamber of the engine. As such, in some embodiments, the air routed into said combustion chambers may be further routed into an air intake system comprising: an air intake coupled to an intake manifold which is coupled to one or more intake runners each of which is coupled to one of the combustion chambers. The method further includes wherein the accumulated air is coupled through the passage only when the condensate is present and the engine output is below a predetermined amount. Briefly, controller 12 may disable airflow form the accumulator through the passageways when the engine output is above the predetermined amount. However, the second embodiment is described with respect to a low engine output for simplicity, and in further embodiments, the method includes wherein the predetermined amount of the engine output corresponds to high load engine conditions. Thus, the accumulator may be additionally or alternatively engaged to deliver collected condensate under other engine operating conditions. For example, if the engine output is high (e.g., greater than the first load threshold), the accumulator may be engaged to produce an increased pressure that serves to increase the rate of condensate delivery.

FIG. 9 shows an example condensation management system including accumulator 902 from a front view relative to the vehicle. The condensation management system includes features in common with the system described with respect to FIG. 4. As such, engine elements described there are not re-described here, although the various parts are identified in FIG. 9 for clarity. Briefly, air intake 42 may draw in air from one or more ducts (not shown). The one or more ducts may draw in cooler or warmer air from outside the vehicle or underneath the hood of the vehicle, respectively. The intake air may travel downstream to CAC 166 where the air is further cooled. To aid in cooling the charge air, ambient airflow from outside the vehicle may enter engine 10 through a vehicle front end and pass across CAC 166. Thus, the heat exchanger comprises an air to air heat exchanger and includes a reservoir to collect the condensate. In response, condensate may form in the CAC when the charge air is cooled below the water dew point.

Condensate collected at the bottom of CAC 166, may then be re-introduced to the engine system at one of three position based on the type of contaminate sensed in the condensate. As mentioned above, the condensation management system according to the second embodiment further includes accumulator 902 for storing pressurized air. Thus, the method comprises routing air from a compressor through a heat exchanger to a combustion chamber of the engine; coupling condensate formed in the heat exchanger through a passage coupled to the combustion chamber; accumulating a portion of the compressed air in an accumulator; and when the engine output is below a predetermined amount, coupling a part of the accumulated air through the passage into the combustion chamber, wherein said compressor is driven by a turbo positioned in the engine exhaust, or by a mechanical coupling to a crankshaft or a camshaft of the engine.

As shown in the example of FIG. 9, accumulator 902 is coupled to the condensation management system in an arrangement whereby a portion of air from the intake system may be directed into the auxiliary canister storage tank under some conditions to increase the pressure therein. For this reason, accumulator 902 includes inlet 910 for connecting the intake system to accumulator 902. Accumulator inlet 910 further includes first accumulator valve 912 for controlling an opening within the inlet line. Because accumulator 902 is configured to route and assist the movement of condensate to the engine using pressurized air stored within the auxiliary canister, accumulator outlet 920 is included for connecting the storage tank to the inlet assembly 202, which further includes first routing valve 210 (not shown). Accumulator outlet 920 also includes a valve referred to as second accumulator valve 922 for controlling an opening within the outlet line. Thus, the two valves can be controlled to fill and empty the canister based on a desired operation of the accumulator (e.g., to route said condensate).

For example, to increase the amount of air stored within accumulator 902, which increases the pressure within the storage tank, first accumulator valve 912 can be opened while second accumulator valve 922 remains closed. Although accumulator filling may occur over a broad range of drive cycles, heavy tip-in, over-boost, and/or rapid deceleration events may represent desirable times to capture this otherwise wasted energy. In this way, the system and methods described herein may further enhance the overall system efficiency. In addition, charging of the accumulator at these example times may advantageously be performed in a manner that is unnoticeable by the vehicle occupants. Then, once the canister has been substantially filled, for instance, because the stored boost pressure exceeds a pressure threshold, first accumulator valve 912 can be closed to allow storage of the pressurized air until its later use by the system. In order to deliver condensate based on the engine conditions, controller 12 may be configured to open second accumulator valve 922 to increase the airflow therein for increasing the rate of condensate delivery via the routing of the condensate to one of the engine positions. In this way, the accumulator may temporarily increase a pressure in the condensate management system to force a delivery of the collected condensate via an injector. Upon completion of the condensate delivery, second accumulator valve 922 may then be actuated to a closed position to prevent additional airflow from flowing through accumulator outlet 922. In another embodiment, controller 12 may be configured to adjust an amount of opening of second accumulator valve 922 to adjust the rate of condensate delivery. For example, the degree of valve opening may be increased to increase the airflow through accumulator 902, and therefore the rate of condensate delivery. Alternatively, the degree of valve opening may be decreased to decrease an airflow from accumulator 902. In this way, the accumulator allows for the condensate to be delivered using the stored pressurized air.

With regard to the air flowing through CAC 166, as air exits the charge air cooler, the intake airflow proceeds to engine 10 via intake manifold 47. FIG. 9 further illustrates that condensate directed to the engine air intake may be routed directly to one or more combustion cylinders of the engine. As such, first pathway 220 is shown extending to a top portion of the engine (not shown) with branching lines 932 that lead to each cylinder of the example multi-cylinder engine. Therefore, instead of routing said condensate to the first position located along the intake manifold, in some embodiments, the condensate may be injected directly into the combustion chambers of the engine. Although not shown, branching lines 932 may also include valves for controlling a rate of condensate delivery to one or more cylinders. Therefore, in some instances, condensate delivery may be evenly distributed to the engine cylinders while in other instances, condensate may be unevenly distributed to the engine cylinders, for example, by injecting increased amounts of condensate to one or more cylinders relative to the remaining cylinders.

Figure 10:
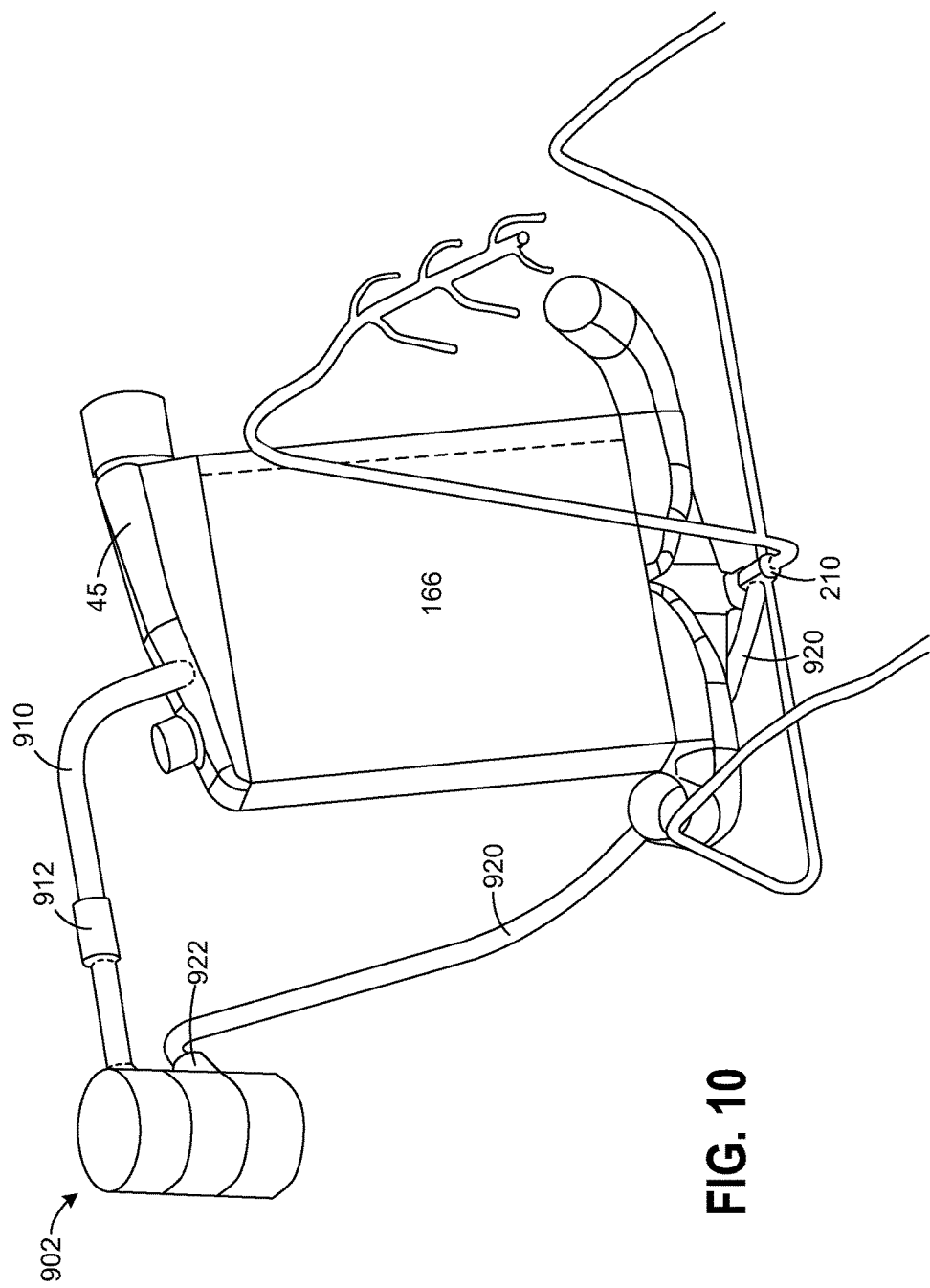

FIG. 10 illustrates an example coupling of accumulator outlet 920 to first routing valve 210. For simplicity, FIG. 10 shows the example condensation management system of FIG. 9 from a rear view relative to the vehicle. As described above, accumulator outlet 920 connects accumulator 902 into first routing valve 210. When configured in this manner, the pressurized contents stored within accumulator 902 can be directed into the condensation management system and further used to deliver a boost pressure capable of routing the condensate to the three positions within engine 10. In addition, because a pressurized system is used, the added boost pressure can be used to deliver condensate to one or more engine cylinders located at a top portion of engine 10 relative to the lowest point of CAC 166 where condensate collects. The stored boost pressure may be used in combination with other pressures within the engine system for routing said condensate. Although an accumulator is included for delivering condensate based on a pressure due to an airflow, in other embodiments, engine 10 and condensate management system 200 may employ a vacuum concept whereby a lower pressure within the engine system is used to pull (or force) the flow of condensate. However, although structural features are different for implementing the vacuum-based system, similar concepts are used as described herein.

Figure 11:
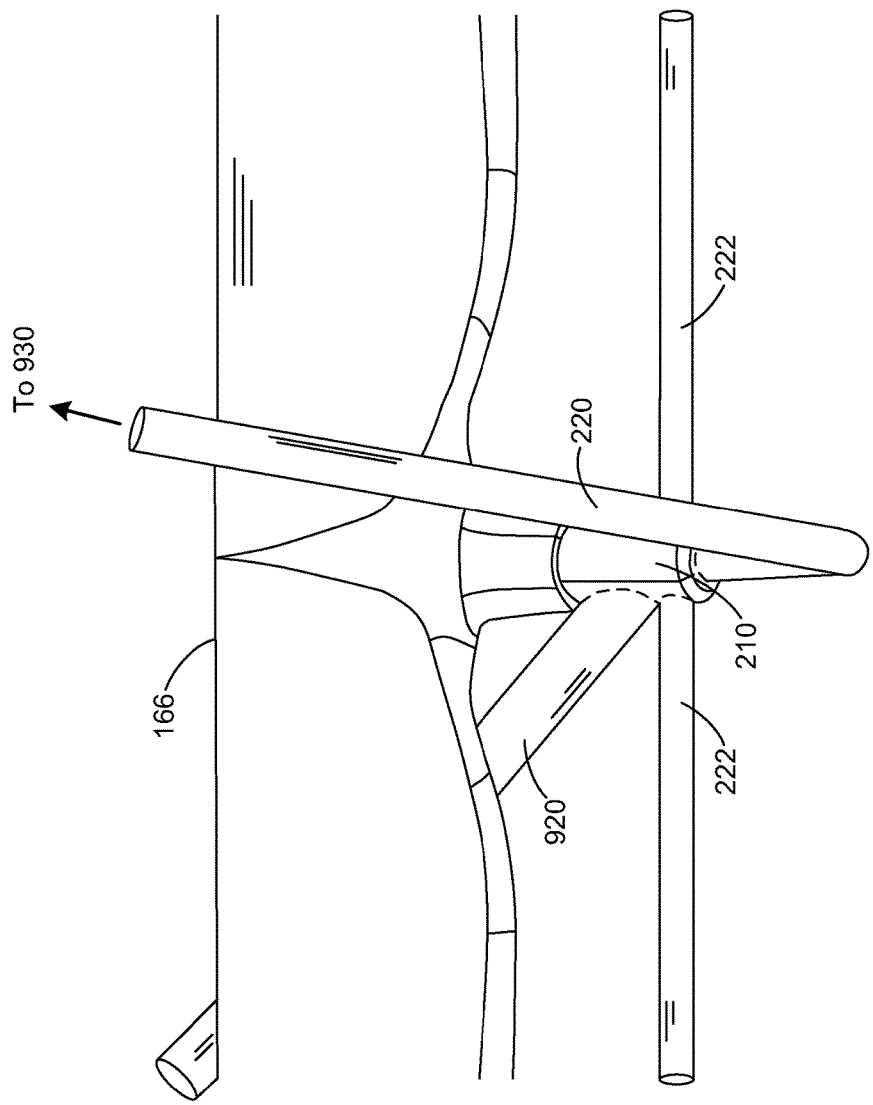

FIG. 11 shows an example valve assembly coupled to the accumulator outlet in greater detail. As shown, accumulator outlet 920 may be connected to first routing valve 210. Although second accumulator valve 922 is shown near accumulator 902 in FIGS. 10 and 11, in some embodiments, second accumulator valve 922 may alternatively be located near first routing valve 210. In still other embodiments, first routing valve 210 may be configured to include the second accumulator valve integrated therein. As such, first routing valve 210 may alternatively control a degree of opening of the outlet valve in order to control a flow of condensate from CAC 166.

Figure 12:
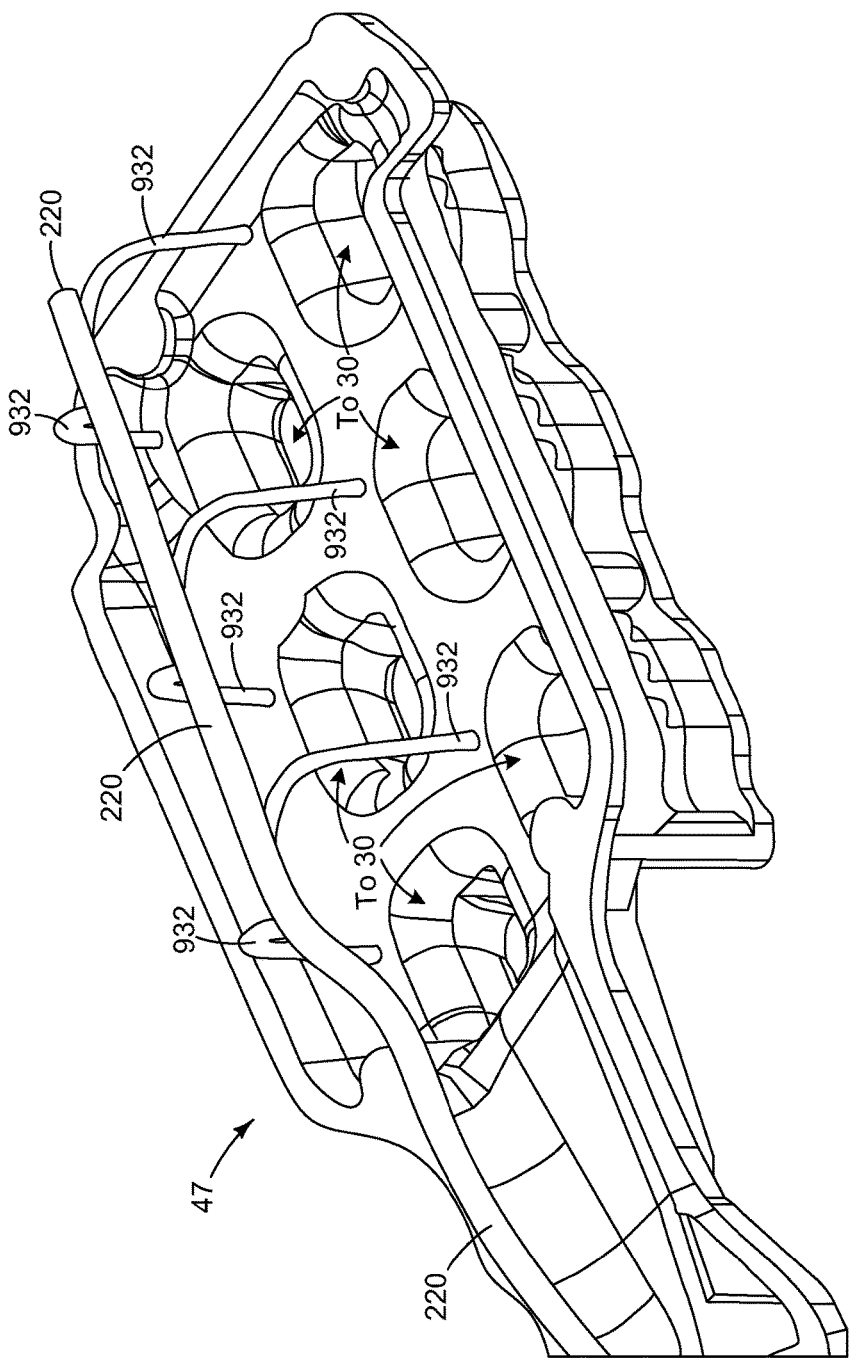

FIG. 12 shows an example multi-port system for distributing routed condensate to individual cylinders of the engine in greater detail. For simplicity, only the bottom half of intake manifold 47 is shown to illustrate the orientation of branching lines 932 relative to the combustion cylinders of the engine With respect to accumulator control, FIGS. 13 and 14 show example flow charts for making adjustments to increase a delivery pressure when routing said condensate. Therefore, although not shown explicitly, accumulator 902 may also communicate with controller 12, which may be configured to make one or more adjustments based on engine operating conditions in order to engage the accumulator.

FIG. 13 illustrates an example flow chart of method 1300 for routing condensate using the accumulator. At 1302, method 1300 includes monitoring one or more engine conditions to determine when engagement of the accumulator for routing the condensate is to occur. For example, when an engine output is low, delivery of the condensate may become difficult. Therefore, a portion of the pressure stored within accumulator 902 may be used to force condensate to a location within the engine system based on the composition of the collected condensate. As such, at 1304, method 1300 includes determining whether an engine output is below a threshold (e.g., below the second or fourth thresholds). Then, if a low engine load is detected, at 1306, method 1300 includes routing the condensate using a portion of the stored boost pressure. The method further includes actuating second accumulator valve 922 to force condensate through one or more passageways of the engine system. Although, actuating the second accumulator valve 922 is described herein for simplicity, in some embodiments, another valve may be alternatively engaged, for example, because accumulator valve 922 is integrated into first routing valve 210. Thereby, other valve configurations are contemplated for routing condensate through the engine system. At 1308, method 1300 further includes metering the rate of condensate delivery based on engine operating conditions and the stored boost pressure. For example, if the stored boost pressure is high (e.g., above a threshold pressure), a flow rate or boost may be increased by increasing a degree of valve opening in accumulator outlet 920. Alternatively, if the pressure in accumulator 902 is low (e.g., falls below the threshold pressure), controller 12 may decrease a flow rate by decreasing a degree of valve opening while still providing added boost to deliver the condensate.

Returning to 1304, if the engine output does not fall below a load threshold, at 1306, method 1300 may include not engaging the accumulator to route said condensate. However, in alternative methods, controller 12 may be programmed to engage the accumulator in order to increase a rate of condensate flow even when a load on the engine is high.

Briefly, as described above, when the system according to the present disclosure includes an accumulator, the method comprises: coupling said condensate to the light off catalyst when the engine output is above a preselected amount and the condensate is substantially free of the contaminate and the light of catalyst is above a predetermined temperature. The system further comprises an engine exhaust coupled to an exhaust of one or more combustion chambers and a coupling between a condensate collecting reservoir and a position in said exhaust downstream of said catalyst. Thereby, the controller may couple the condensate to the position downstream of the catalyst while disabling an airflow from the accumulator through the passageways when an engine output is below a predetermined amount in a particular operating condition. Further, the particular operating condition may include a pressure in the accumulator below a threshold value. In addition, the method comprises an engine exhaust coupled to an exhaust of one or more of the combustion chambers and a coupling between the condensate collecting reservoir and a position in said exhaust upstream of said catalyst. Therefore, the system includes a controller that couples the condensate to the position upstream of the catalyst and disabling an airflow from the accumulator through the passageways when the engine output is above a predetermined amount and temperature of the catalyst is above a preselected amount.

With respect to the filling of an empty auxiliary canister, FIG. 14 illustrates example method 1400 for filling the accumulator with pressurized gas. As such, airflow from CAC outlet tank 45 may be directed to accumulator 902 through accumulator intake 910 under some engine operating conditions. Therefore, control system 12 may be configured to actuate one or more valves based on the engine operating conditions, as shown at 1402.

At 1404, engine 10 may be configured to detect a pressure within accumulator 902 relative to a pressure threshold that is used to indicate an amount of pressurized air within the accumulator. Although not shown explicitly, accumulator 902 may further include a pressure sensor to indicate the stored boost pressure in some embodiments. If the stored boost pressure exceeds the first pressure threshold that indicates a low content level, at 1406 controller 12 may direct air into accumulator 902 during an episode of high engine output (e.g., engine output above the first or third threshold) while the airflow therein is increased. In response, at 1410, method 1400 may adjust second accumulator valve 922 to the closed position to allow airflow directed toward the storage tank to be stored while preventing further flow from exiting the auxiliary canister. Then, at 1412, method 1400 includes actuating first accumulator valve 912 to an open position to allow airflow to accumulator 902 through the inlet line. Alternatively, if the stored boost pressure does not fall below the first pressure threshold, at 1430, method 1400 may determine that sufficient contents are stored within accumulator 902. In this case, controller 12 may be programmed to prevent the addition of further contents by, for example, actuating one or more of the first and second accumulator valves to the closed position.

Additionally, at 1420, a second pressure threshold is included to indicate storage canister that is substantially full. Upon reaching the second higher pressure threshold, at 1422, method 1400 may actuate first accumulator valve 912 to the closed position to store the contents therein until a time when the pressurized contents are to be used for routing the condensate. Alternatively, while the pressure falls below the second pressure threshold, at 1424, the method may continue filling the auxiliary canister based on engine operating conditions. In other words, as long as the pressure in the intake system exceeds the tank pressure, air may flow in the direction of the canister. Therefore, the inlet valve may remain open to increase the stored boost pressure by increasing the amount of contents contained within the storage tank. The feedback cycle may continue until the auxiliary canister has been filled. For clarity, although not shown, method 1400 further includes delivering condensate using the pressurized contents stored within the auxiliary canister while the canister is simultaneously filled. In other words, sufficient pressure may exist in the canister to allow the second accumulator valve 922 to be opened while first accumulator valve 912 is also open. Controller 12 may thus be configured to make one or more valve adjustments based on a determined rate of boost pressure delivered from the canister in relation to the rate of boost pressure delivered to the canister.

FIGS. 15 and 16 show a third embodiment for routing collected condensate to engine 10. In the third embodiment, an inline engine is shown wherein the lowest point in the intake system resides in intake manifold 47 rather than beneath CAC 166 as described above. This is because engine 10 according to the third embodiment includes an air to water heat exchanger as opposed to an air to air heat exchanger as described above for the V-engine configuration having an air to air heat exchanger (e.g., CAC 166). As described herein, in this engine configuration, which is illustrated with respect to an inline engine, condensate does not collect within the heat exchanger as described above. In addition, substantially no pressure differential forms across the heat exchanger because the air to water heat exchanger has a reduced size compared to CAC 166. Thus, routing collected condensate to various locations within the engine system presents additional distribution challenges that are solved using an accumulator to aid in the distribution of condensate under all engine operating conditions. For these reasons, the third embodiment includes a reservoir that has been relocated to the lowest point in the intake system where condensation collects, namely the intake manifold plenum. Accumulator 902 is also included to force condensate collected in said reservoir through the various passageways.

FIG. 15 shows a side view of the third embodiment of the condensation management system. The third embodiment relates to an inline engine configuration that may be installed within the engine compartment in any power-train position. For example, in some embodiments, the orientation of the inline engine defined by the linear direction of the runners may be parallel to the longitudinal axis of the vehicle while in other embodiments the orientation of the engine may be orthogonal to the longitudinal axis of the vehicle. In addition, a system according to the third embodiment allows for the turbocharger to be arranged in any configuration. In this way, an increased design flexibility of the engine can be realized. In FIG. 15, the inline engine is arranged perpendicular to the longitudinal axis of the vehicle so the view shown represents a side view of the engine.

In the inline engine according to the third embodiment, the collection area is located within intake manifold 47. Therefore, condensate is collected in condensate reservoir 1502 that is relocated to the lowest point within intake manifold 47. As such air that enters CAC inlet tank 42 may be cooled as it flows through CAC 1566, which is shown as a water to air charge air cooler. Then, as the airflow continues through intake manifold 47, condensate may collect at reservoir 1502. As described above, reservoir 1502 may be configured to include inlet tank assembly 202 for routing said collected condensate throughout engine 10 in the manner already described. In addition, accumulator 902 may be reconfigured based on the structure of the engine and intake system. For example, FIG. 15, shows accumulator inlet 910 in communication with CAC 1566 outlet tank 45. Therefore, airflow within the system may be directed to the auxiliary canister to increase the stored boost pressure within accumulator 902 in the same manner described above. Accumulator 902 further connects to routing valve 210 via inlet tank assembly 202. As described below with respect to FIG. 16, the inline engine further includes an intake manifold coupled to engine runners 1510 for directing the airflow to combustion chambers within the engine. Thus, intake manifold 47 connects to a plurality of intake runners 1510 that lead to combustion chambers within engine 10. In addition, first pathway 220 is shown as multiple passageways, wherein each of said passageways are coupled to one of a plurality of intake runners each of which communicates with a corresponding one of said combustion chambers, and wherein the reservoir communicates with each of the passageways, and wherein the accumulator communicates with the reservoir.

To illustrate these connections in greater detail, FIG. 16 shows the third embodiment of the condensation management system from a front view. As described briefly above, condensate reservoir 1502 is located at the lowest point within intake manifold 47. The example inline engine further includes multiple combustion chambers, an air intake manifold and intake runners coupling the manifold to the intake runners, and an exhaust coupled to a light off catalyst (not shown); a turbocharger having a turbo coupled to the exhaust and a compressor driven by the turbo (not shown); a heat exchanger having an input connected to the compressor and an output coupled to the combustion chambers through the intake manifold and the intake runners; and a reservoir connected to the heat exchanger and a plurality of passageways each connected between the reservoir and each of the intake runners to route condensate to the combustion chambers; an accumulator having an input coupled to the compressor and an output coupled to each of the passageways; and a controller controlling airflow from the accumulator through the passageways. In FIG. 16, first pathway 220 that is a passageway for connecting inlet tank assembly 202 to the intake system includes multiple branching lines 932 for coupling the condensate reservoir to individual runners of the engine. Thereby, routing the condensate to each combustion chamber of the engine may be individually or collectively controlled to control a distribution of the condensate to the intake system.

In this way, the system and methods according to the present disclosure may be used to remove collected condensate from the charge air cooler during vehicle operation. Furthermore, routing the condensate to either the air intake system or a position in the engine exhaust based upon both the type of contaminate in the condensate and operating parameters of the engine or the catalyst offers additional advantages for cooling the catalyst during high engine loads. For example, when the engine is operating at a high load in the absence of engine oil (e.g., because it is not present as a contaminate), the condensate may be routed into the engine exhaust upstream of the catalyst to cool the catalyst. In another example, when the engine is operating at a high load and engine oil is present in the contaminate, the condensate may be routed into the engine air intake to combust the oil without contaminating the catalyst. In still another aspect, engine power may be reduced when engine coolant is in the condensate to allow the operator to drive to a safe place without harming the engine.

Note that routing condensate to either said combustion chamber or a position in the engine exhaust (or another, different, position in the engine system) may be based upon a contaminate in said condensate and operating parameters of the engine and/or the catalyst, such operation may include routing condensate to each of these positions under different conditions. For example, the routine may include routing condensate to said combustion chamber, and routine condensate to a position in the engine exhaust, and routine condensate to another, different, position in the engine system, based upon an amount of contaminate in said condensate and operating parameters of the engine and/or the catalyst. One embodiment may include routing condensate only to the combustion chamber for a first amount of contaminate in the condensate, routing condensate only to the engine exhaust, for a second amount of contaminate in the condensate, and routing condensate only to another, different, position in the engine system for a third amount of contaminate, and or based on operating parameters of the engine and/or the catalyst.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
routing air through a heat exchanger and into one or more combustion chambers of an engine via an air intake system comprising an air intake coupled to an intake manifold which is coupled to one or more intake runners each of which is coupled to said one or more combustion chambers;
forming a condensate in said heat exchanger; and
routing said condensate to each of said one or more combustion chambers via a first position and to a second and third position in an engine exhaust based upon a contaminate in said condensate and operating parameters of the engine or a catalyst coupled to the engine exhaust, said condensate routed to the first position along said engine air intake system in a first mode of operation, the second position along the engine exhaust in a second mode of operation, and the third position along the engine exhaust in a third mode of operation, wherein said first mode of operation comprises engine operation at a high load with said contaminate including engine oil, or said first mode of operation comprises engine operation under fuel enrichment conditions with said contaminate including engine oil.

2. The method recited in claim 1, wherein said second position along the engine exhaust is upstream of the catalyst and said second mode of operation comprises engine operation at a high load with said contaminate being substantially free of engine oil.

3. The method recited in claim 1, wherein said second mode of operation comprises the catalyst operating at a temperature inferred to be above a predetermined temperature with said contaminate being substantially free of engine oil.

4. The method recited in claim 3, wherein catalyst temperature is inferred from one or more of the following variables: combustion air/fuel ratio, exhaust gas recirculation, engine speed, ignition timing, and airflow through the engine.

5. The method recited in claim 1, further comprising reducing power of the engine when said contaminate includes engine coolant.

6. The method recited in claim 1, wherein said third position along the engine exhaust is downstream of the catalyst and said third mode of operation comprises engine operation at a low load and no significant engine oil is detected in said condensate.

7. The method recited in claim 6, wherein said third mode of operation with said condensate routed to said third position occurs more often than said second mode of operation with said condensate routed to said second position or said first mode of operation with said condensate routed to said first position.

8. The method of claim 1, wherein said heat exchanger comprises an air to air heat exchanger and includes a reservoir to collect said condensate.

9. The method recited in claim 1, wherein said heat exchanger comprises a liquid to air heat exchanger and said condensate is collected from said intake manifold.

10. A method, comprising:
routing air through a heat exchanger and into one or more combustion chambers of an engine;
forming a condensate in said heat exchanger;
routing said condensate to either said one or more combustion chambers or a position in an engine exhaust based upon a contaminate in said condensate and operating parameters of the engine or a catalyst coupled to the engine exhaust, said heat exchanger comprising a liquid to air heat exchanger and said condensate collected from an intake manifold of an air intake system, and
reducing power of the engine when said contaminate includes engine coolant.

11. The method of claim 10, wherein the air intake system further comprises an air intake coupled to the intake manifold which is coupled to one or more intake runners, each of which is coupled to one of said combustion chambers.

12. An engine system having an engine air intake and a light off catalyst coupled to an engine exhaust, comprising:
a turbocharger having a compressor driven by a turbo coupled to the engine exhaust upstream of the catalyst;
a heat exchanger having an input coupled to the compressor and an outlet coupled to the air intake;
a reservoir coupled to a bottom of the heat exchanger to collect condensate formed by the heat exchanger; and
a controller including instructions to route the condensate to a first position along the engine air intake in a first mode of operation, a second position along the engine exhaust in a second mode of operation, and a third position along the engine exhaust in a third mode of operation, and further comprising:
a first metering valve coupled between the reservoir and the air intake;
a second metering valve coupled between the reservoir and the engine exhaust upstream of the catalyst and downstream of the turbo; and
a third metering valve coupled between the reservoir and the engine exhaust downstream of the catalyst.

13. The system recited in claim 12, wherein the first mode of operation comprises engine operation at a high load with the condensate including engine oil, and wherein the controller activates the first metering valve during the first mode of operation.

14. The system recited in claim 12, wherein the second position along the engine exhaust is upstream of the catalyst and the second mode of operation comprises engine operation at a high load with the condensate being substantially free of engine oil, and wherein the controller activates the second metering valve during the second mode of operation.

15. The system recited in claim 12, wherein the third position along the engine exhaust is downstream of the catalyst and the third mode of operation comprises engine operation at a low load and no significant engine oil is detected in the condensate, and wherein the controller activates the third metering valve during the third mode of operation.

16. The system recited in claim 12, wherein the controller activates the first metering valve when the engine is operating at a low or moderate load.

* * * * *